United States Patent
Siomina et al.

(10) Patent No.: US 9,188,659 B2
(45) Date of Patent: Nov. 17, 2015

(54) METHODS AND NETWORK NODES FOR POSITIONING BASED ON DISPLACEMENT DATA

(71) Applicant: TELEFONAKTIEBOLAGET L M ERICSSON (PUBL), Stockholm (SE)

(72) Inventors: Iana Siomina, Solna (SE); Yang Zhang, Shanghai (CN)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 137 days.

(21) Appl. No.: 13/933,001

(22) Filed: Jul. 1, 2013

(65) Prior Publication Data
US 2014/0099970 A1 Apr. 10, 2014

Related U.S. Application Data

(60) Provisional application No. 61/712,195, filed on Oct. 10, 2012.

(51) Int. Cl.
| | |
|---|---|
| H04W 24/00 | (2009.01) |
| G01S 5/00 | (2006.01) |
| G01S 19/49 | (2010.01) |
| G01S 5/02 | (2010.01) |
| H04W 64/00 | (2009.01) |
| G01C 21/16 | (2006.01) |

(52) U.S. Cl.
CPC .............. *G01S 5/009* (2013.01); *G01C 21/165* (2013.01); *G01S 5/0036* (2013.01); *G01S 5/0081* (2013.01); *G01S 5/0263* (2013.01); *G01S 5/0294* (2013.01); *G01S 19/49* (2013.01); *H04W 64/00* (2013.01)

(58) Field of Classification Search
CPC .................................. H04W 64/00; H04W 4/02
USPC ............... 455/456.1, 456.2, 456.6; 340/573.1
See application file for complete search history.

(56) References Cited

U.S. PATENT DOCUMENTS

| | | | |
|---|---|---|---|
| 2004/0132461 A1 | 7/2004 | Duncan | |
| 2006/0125644 A1* | 6/2006 | Sharp | ................... 340/573.1 |
| 2009/0054076 A1 | 2/2009 | Evennou et al. | |
| 2010/0331012 A1 | 12/2010 | Zhang | |
| 2011/0250906 A1 | 10/2011 | Siomina et al. | |

FOREIGN PATENT DOCUMENTS

| | | |
|---|---|---|
| EP | 2 026 088 A2 | 2/2009 |
| EP | 2 500 692 A1 | 9/2012 |
| WO | WO 2009/021068 A1 | 2/2009 |
| WO | WO 2009/068530 A1 | 6/2009 |
| WO | WO 2011/126448 A2 | 10/2011 |

* cited by examiner

*Primary Examiner* — Chuck Huynh

(57) ABSTRACT

Methods, a radio network node (110), a wireless device (120) and a positioning node (130) for obtaining a location estimate are disclosed. The location estimate indicates a location of a target radio node (110, 120). The wireless device (120) is operated to obtain the location estimate by use of functionality provided by a cellular telecommunication system (100). A node (110, 120, 130) refers to any one of the radio network node (110), the wireless device (120) and the positioning node (130). The node (110, 120, 130) obtains (308, 312, 316) a reference point for the target radio node (110, 120). The node (110, 120, 130) obtains (309, 313, 317) displacement information indicating displacement, in relation to the reference point, of the target radio node (110, 120). The node (110, 120, 130) sends (314a, 318a)) the displacement information and/or obtains (310, 314b, 318b) the location estimate by dead reckoning based on the displacement information and the reference point.

34 Claims, 6 Drawing Sheets

METHODS AND NETWORK NODES FOR POSITIONING BASED ON DISPLACEMENT DATA

CROSS-REFERENCE TO RELATED APPLICATION

This application claims the benefit of U.S. Provisional Patent Application 61/712,195 filed Oct. 10, 2012.

TECHNICAL FIELD

Generally, embodiments herein relate to wireless communication networks and in particular to positioning. In particular, methods for obtaining a location estimate, a radio network node, a wireless device and a positioning node for obtaining a location estimate are disclosed.

BACKGROUND

The possibility to determine the position of a mobile device has enabled application developers and wireless network operators to provide location based, and location aware, services. Examples of those are guiding systems, shopping assistance, friend finder, presence services, community and communication services and other information services giving the mobile user information about their surroundings.

In addition to the commercial services, the governments in several countries have put requirements on the network operators to be able to determine the position of an emergency call. For instance, the governmental requirements in the United States of America (USA), such as Federal Communications Commission Emergency 9-1-1 (FCC E911) that it must be possible to determine the position of a certain percentage of all emergency calls. The requirements make no difference between indoor and outdoor environment.

In many environments, the position can be accurately estimated by using positioning methods based on Global Positioning System (GPS). However, GPS-based positioning may often have unsatisfactory performance e.g. in urban and/or indoor environments. Complementary positioning methods could thus be provided by a wireless network. In addition to User Equipment-based (UE-based) Global Navigation Satellite System (GNSS including Global Positioning System, GPS), the following methods are available in the Long Term Evolution (LTE) standard for both the control plane and the user plane,
- Cell Identification (CID),
- Evolved-CID, such as E-CID including network-based Angle of Arrival (AoA),
- Assisted-GNSS including Assisted-GPS,
- Observed Time Difference of Arrival (OTDOA),
- Uplink (UL) Time Difference of Arrival (UTDOA)—being currently standardized.

TDOA-/TOA-based methods, e.g. OTDOA, UTDOA or GNSS/A-GNSS: A typical format of the positioning result is an ellipsoid point with uncertainty circle/ellipse/ellipsoid which is the result of intersection of multiple hyperbolas/hyperbolic arcs (e.g. OTDOA) or circles/arcs (e.g. UTDOA, GNSS, or A-GNSS).

Hybrid methods: Since the hybrid technique involves a mix of any of the methods above, the position result can be any shape, but in many cases it is likely to be a polygon.

Cellular positioning methods often rely on knowledge of anchor nodes' locations, e.g., evolved Node B (eNodeB) or beacon device locations for OTDOA, Location Measurement Unit (LMU) antenna locations for UTDOA, eNodeB locations for E-CID. The anchor nodes' location may also be used to enhance Adaptive Enhanced Cell ID (AECID), hybrid positioning, etc.

Dead Reckoning (DR), aka deduced reckoning, is the process of calculating one's current position by using a previously determined position, or fix, and advancing that position based upon known or estimated speeds over elapsed time, and course.

In cellular networks, GPS receivers with dead reckoning are used during GPS unavailability period, e.g., in tunnels, parking garages, and other common situations. When the GPS signals are restored, the dead-reckoning solutions may also provide a starting point for the GPS receiver configuration to search for GPS signals.

Three types of GPS receivers that support dead reckoning are known:
- GPS receiver that utilizes vehicle speed signal input
- GPS receivers utilizing wheel rotation data, where vehicle's speed and steering direction is estimated from wheel rotation data
- GPS receiver with integrated inertial sensors, e.g., gyro sensor or acceleration sensor.

The disadvantage with dead reckoning based on GPS is mandating GPS receivers which may be not affordable e.g. for low-cost wireless devices.

The three key network elements in an LTE positioning architecture are the Location Service (LCS) Client, the LCS target and the LCS Server. The LCS Server is a physical or logical entity managing positioning for a LCS target device by collecting measurements and other location information, assisting the terminal in measurements when necessary, and estimating the LCS target location. A LCS Client is a software and/or hardware entity that interacts with a LCS Server for the purpose of obtaining location information for one or more LCS targets, i.e. the entities being positioned. LCS Clients may reside in a network node, external node, Public Safety Answering Point (PSAP), user equipment (UE), radio base station, etc., and they may also reside in the LCS targets themselves. An LCS Client (e.g., an external LCS Client) sends a request to LCS Server (e.g., positioning node) to obtain location information, and LCS Server processes and serves the received requests and sends the positioning result and optionally a velocity estimate to the LCS Client.

Position calculation can be conducted, for example, by a positioning server, e.g. Evolved SMLC (E-SMLC) or Secure User Plane Location Platform (SLP) in LTE or UE. The latter corresponds to the UE-based positioning mode, whilst the former may be network-based positioning (calculation in a network node based on measurements collected from network nodes such as LMUs or eNodeBs) or UE-assisted positioning (calculation is in a positioning network node based on measurements received from UE).

FIG. 1a illustrates the UL positioning architecture specified by 3rd Generation Partnership Project (3GPP). Although UL measurements may in principle be performed by any radio network node (e.g., eNodeB), UL positioning architecture may include specific radio network nodes such as UL measurement units (e.g., LMUs) which e.g. may be logical and/or physical nodes, may be integrated with radio base stations or sharing some of the software or hardware equipment with radio base stations or may be completely standalone nodes with own equipment (including antennas). The architecture is not finalized yet, but there may be communication protocols between LMU and positioning node, and there may be some enhancements for LTE Positioning Protocol A (LPPa) or similar protocols to support UL positioning. A new interface, "SLm", between the E-SMLC and LMU is being standardized for uplink positioning. The interface is terminated between a positioning server (E-SMLC) and LMU. It is used to transport SLmAP, aka LMUp, protocol messages over the E-SMLC-to-LMU interface. Several LMU deployment options are possible. For example, an LMU may be a standalone physical node, it may be integrated into eNodeB or it may be sharing at least some equipment such as antennas with eNodeB—these three options are illustrated in the FIG. 1a.

LPPa is a protocol between eNodeB and LCS Server specified only for control-plane positioning procedures, although it still can assist user-plane positioning by querying eNodeBs for information and eNodeB measurements.

In LTE, UTDOA measurements, UL RTOA, are performed on Sounding Reference Signals (SRS). To detect an SRS signal, LMU needs a number of SRS parameters to generate the SRS sequence which is to be correlated to receive signals. SRS parameters would have to be provided in the assistance data transmitted by positioning node to LMU; these assistance data would be provided via an Application Protocol referred to as SLmAP (SLmAP), aka Location Measurement Unit protocol (LMUp), as defined in 3GPP TS 36.456/36.459. However, these parameters are generally not known to the positioning node, which needs then to obtain this information from eNodeB configuring the SRS to be transmitted by the UE and measured by LMU; this information would have to be provided in LPPa or similar protocol.

In FIG. 1b, architecture for downlink (DL) positioning according to prior art is illustrated.

Positioning Quality of Service (QoS) normally refers to two aspects of requirement: positioning accuracy and response time. The importance of each of the two quality characteristics is that they are generally service- and LCS application dependent. Often the positioning accuracy is of a more importance and typically it is the bottleneck in implementation.

Accuracy, and confidence, is important in several parts of the positioning system. First, when a positioning request arrives from the end user to the positioning node, a decision on which positioning method to use needs to be taken. The positioning node then needs to look up prior accuracies of the available positioning methods and compared these to the signaled requested accuracy from the end user, in order to select a most suitable positioning method. Then when a positioning results is available, the achieved accuracy is computed in the positioning node and it is determined if the requested accuracy was met. If so the positioning node reports the result and possibly the accuracy, back to the end user. If not met, the positioning node may proceed with a positioning re-attempt or another positioning method.

Positioning QoS may be of two types:

Target positioning QoS, aka target LCS quality, which may be associated, e.g., with the LCS Client type or service type and is typically known prior positioning method selection, e.g., received by positioning node from MME or obtained by a pre-defined rule, Positioning result QoS or positioning result quality, which needs to be distinguished from positioning measurement quality; there may be multiple measurements used for positioning of the same UE, and each measurement is characterized with own quality; the set of measurements and their qualities also impact the positioning result quality, but measurement quality is not the same as the positioning result quality.

AECID is one kind of fingerprinting positioning technology that refines the basic cell identity positioning method in a variety of ways. It is Ericsson proprietary.

The AECID positioning method is based on the idea that high precision positioning measurements, e.g. A-GPS measurements, can be seen as points that belong to regions where certain cellular radio propagation condition persist.

Step 1: A-GPS positioning is performed at the same time of UE network signal measurement. The AECID positioning method introduces a tagging of high precision measurements according to certain criteria, e.g. including The cell Ids that are detected by the terminal, in each grid point.

Quantized path loss or signal strength measurements, w.r.t. multiple RBSs, performed by the terminal, in each grid point.

Quantized Round Trip Time, such as Round Trip Time in Wideband Code Division Multiple Access (WCDMA) or Timing Advance (TA) in Global System for Mobile communications (GSM) and LTE, or UE Rx-Tx time difference(in LTE) in each grid point.

Quantized noise rise, representing the load of a Code Division Multiple Access (CDMA) system, in each grid point.

Quantized signal quality e.g. RxQual in GSM, Ec/NO in WCDMA and Reference Signal Received Quality (RSRQ) in LTE.

Radio connection information like the radio access bearer (RAB).

Quantized time.

It is noted that the tag consist of a vector of indices, each index taking an enumerable number of discrete values. Continuous variables used for tagging, like path loss, hence need to be quantized.

Step 2: Collect all high precision positioning measurements that have the same tag in separate high precision measurement clusters, and perform further processing of said cluster in order to refine it. Geographical region can be smaller than the extension of a cell of the cellular system.

Step 3: A polygon that represents the geographical extension of a cluster is computed, for each stored high precision position measurement cluster. The two most pronounced properties of the algorithm include:

The area of the polygon is minimized (accuracy hence maximized).

The probability that the terminal is within the polygon (the confidence) is precisely known (it is set as a constraint in the algorithm).

Step 4: For an incoming positioning request, the UE's network measurement is firstly obtained. By looking up cell Ids or tags, the polygon corresponding to the determined tag is then looked up in the tagged database of polygons, followed by reporting, e.g. over Radio Access Network Application Part (RANAP) using the polygon format.

SUMMARY

An object is to improve position accuracy in the LTE positioning architecture of the above mentioned kind.

According to an aspect, the object is achieved by a method, performed by a radio network node, of obtaining a location estimate. The location estimate indicates a location of a target radio node. The radio network node obtains a reference point for the target radio node. The radio network node obtains displacement information indicating displacement, in relation to the reference point, of the target radio node. The radio network node sends at least the displacement information to another network node. Alternatively or additionally, the radio network node obtains the location estimate by dead reckoning based on the displacement information and the reference point.

According to another aspect, the object is achieved by a radio network node configured to obtain a location estimate. The location estimate indicates a location of a target radio node. The radio network node comprises a processing circuit configured to obtain a reference point for the target radio node, and to obtain displacement information indicating displacement, in relation to the reference point, of the target radio node. Moreover, the processing circuit is further configured to send at least the displacement information to another network node, and/or to obtain the location estimate by dead reckoning based on the displacement information and the reference point.

According to a further aspect, the object is achieved by a method, performed by a wireless device, of obtaining a location estimate. The location estimate indicates a location of the wireless device. The wireless device is operated to obtain the location estimate by use of functionality provided by a cellular telecommunication system. The wireless device obtains a reference point for the wireless device. The wireless device obtains displacement information indicating displacement, in relation to the reference point, of the wireless device. The wireless device sends at least the displacement information to another network node. Alternatively or additionally, the wireless device obtains the location estimate by dead reckoning based on the displacement information and the reference point.

According to a still further aspect, the object is achieved by a wireless device configured to obtain a location estimate. The location estimate indicates a location of the wireless device. The wireless device is operated to obtain the location estimate by use of functionality provided by a cellular telecommunication system. The wireless device comprises a processing circuit configured to obtain a reference point for the wireless device; and to obtain displacement information indicating displacement, in relation to the reference point, of the wireless device. Moreover, the processing circuit is further configured to send at least the displacement information to another network node, and/or to obtain the location estimate by dead reckoning based on the displacement information and the reference point.

According to yet another aspect, the object is achieved by a method, performed by a positioning node, of obtaining a location estimate. The location estimate indicates a location of a target radio node. The positioning node obtains a reference point for the target radio node. The positioning node obtains displacement information indicating displacement, in relation to the reference point, of the target radio node. The positioning node obtains the location estimate by dead reckoning based on the displacement information and the reference point.

According to a further aspect, the object is achieved by a positioning node configured to obtain a location estimate. The location estimate indicates a location of a target radio node. The positioning node comprises a processing circuit configured to obtain a reference point for the target radio node. Furthermore, the processing circuit is configured to obtain displacement information indicating displacement, in relation to the reference point, of the target radio node. Moreover, the processing circuit is configured to obtain the location estimate by dead reckoning based on the displacement information and the reference point.

Generally, a node may herein refer to any one of the radio network node, the wireless device and the positioning node. Thanks to that the node obtains a reference point and displacement information in relation to the reference point, the node may utilize the displacement information, as well as the reference point, when obtaining, such as estimating, calculating, determining or the like, the location estimate by dead reckoning. Expressed, differently, the displacement information is associated to the reference point. The displacement information may for example indicate a distance and a direction. In such an example, it will be possible to determine the location estimate for example by assuming that the target node has proceeded, i.e. travelled, the distance from the reference point in the direction given by the displacement information.

An advantage is that dead reckoning is enabled in the LTE positioning architecture, The embodiments described herein are not limited to the above-summarized features and advantages. Indeed, those skilled in the art will recognize additional features and advantages upon reading the following detailed description, and upon viewing the accompanying drawings.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

The embodiments herein are described more fully hereinafter with reference to the accompanying drawings, in which examples of embodiments are shown. The embodiments herein may, however, be embodied in many different forms and should not be construed as limited to the description set forth herein. It should also be noted that these embodiments are not mutually exclusive. Thus, components or features from one embodiment may be assumed to be present or used in another embodiment, where such inclusion is suitable.

In order to better appreciate the embodiments herein, the following analysis of some problems with prior art is provided here.

Technical value of velocity information, or displacement information, is so far not explored adequately. The use of the velocity in current standard is not specified for dead reckoning. Solution in network self-diagnostic and AECID self-learning are subject to maneuver of terminal. In that respect U.S. patent application Ser. No. 12/774,802 "TDOA based Cell Data Reconstruction" is hereby incorporated by reference. It is in general rather common to provide position accuracy information (e.g., uncertainty with or without confidence level). However, it is unclear how to calculate position accuracy when dead reckoning is used as a positioning method. It is not straightforward how to hybridize dead reckoning with other positioning methods. Is not straightforward whether/how the quality of the dead reckoning predictions should be obtained. It is not straightforward how should the network side control/arrange dead reckoning positioning to make it of most practical value.

At least some of the embodiments described herein comprise:
  Dead reckoning methods in LTE or with a 3GPP-like network architecture
  Solution to control/arrange dead reckoning at network side.
  Methods of obtaining network side location estimate via dead reckoning.
  Methods for controlling and enhancing positioning QoS with dead reckoning, e.g.,
    together with some other information, velocity and its uncertainty are used to deduce a location which may further be used for enhancing positioning QoS;
    Factors are introduced to achieve better estimate of positioning QoS;
    Methods of adaptively configuring obtaining the displacement data for dead reckoning, e.g., adaptively to the positioning QoS.
  Methods for implementing hybrid positioning based on dead reckoning.
  Positioning method selection with dead reckoning positioning.

Figure 2:
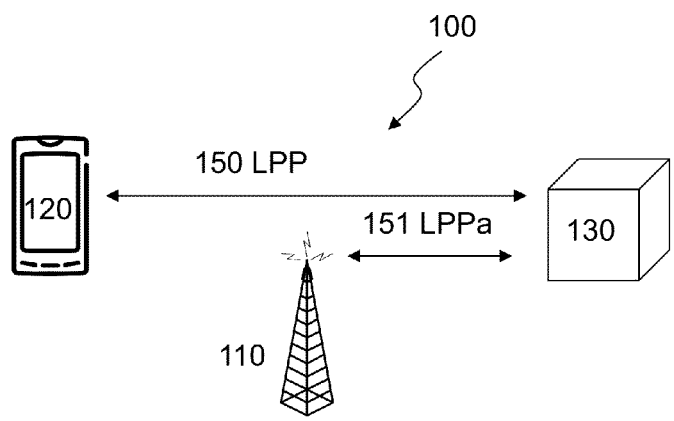
FIG. 2 is a schematic overview of an exemplifying radio communication system in which embodiments herein may be implemented.

FIG. 2 depicts an exemplifying radio communications system 100 in which embodiments herein may be implemented. In this example, the radio communications system 100 is a Long Term Evolution (LTE) system. In other examples, the radio communication system may be any 3GPP cellular communication system, such as a Wideband Code Division Multiple Access (WCDMA) network, a Global System for Mobile communication (GSM network) or the like.

For purposes of illustration and explanation only, these and other embodiments are described herein in the context of operating in a radio access network (RAN) that communicates over radio communication channels with wireless terminals (also referred to as user equipment, or "UEs"). More particularly, specific embodiments are described in the context of systems using LTA technology, as standardized by the membership of the 3$^{rd}$ Generation Partnership Project (3GPP). It will be understood, however, that the embodiments are not limited to those embodiments which are described herein and may be embodied generally in various types of communication networks such as WCDMA, CDMA, CDMA2000, GSM etc. As used herein, the terms mobile terminal, wireless terminal, or UE can refer to any device that receives data from a communication network, and may include, but are not limited to, a mobile telephone ("cellular" telephone), laptop/portable computer, pocket computer, hand-held computer, and/or desktop computer.

The radio communication system 100 comprises a radio network node 110, such as a base station or LMU.

Moreover, the radio communication system 100 comprises a wireless device 120. The measuring nodes may be any one or more of the radio network node 110 and the wireless device 120.

Also note that the use of terminology such as "base station" (which may be referred to in various contexts as NodeB, for example) and "wireless terminal," "mobile terminal," or "wireless device" (often referred to as "UE" or "User Equipment") should be considering non-limiting and does not necessarily imply a certain hierarchical relation between two particular nodes of a communication link. In general, a base station (e.g., a "NodeB") and a wireless terminal (e.g., a "UE") may be considered as examples of respective different communications devices that communicate with each other over a wireless radio channel. While embodiments discussed herein may focus on wireless transmissions in a downlink from a NodeB to a UE, the inventive techniques may also be applied, for example, to uplink transmissions in some contexts.

Figure 1A:
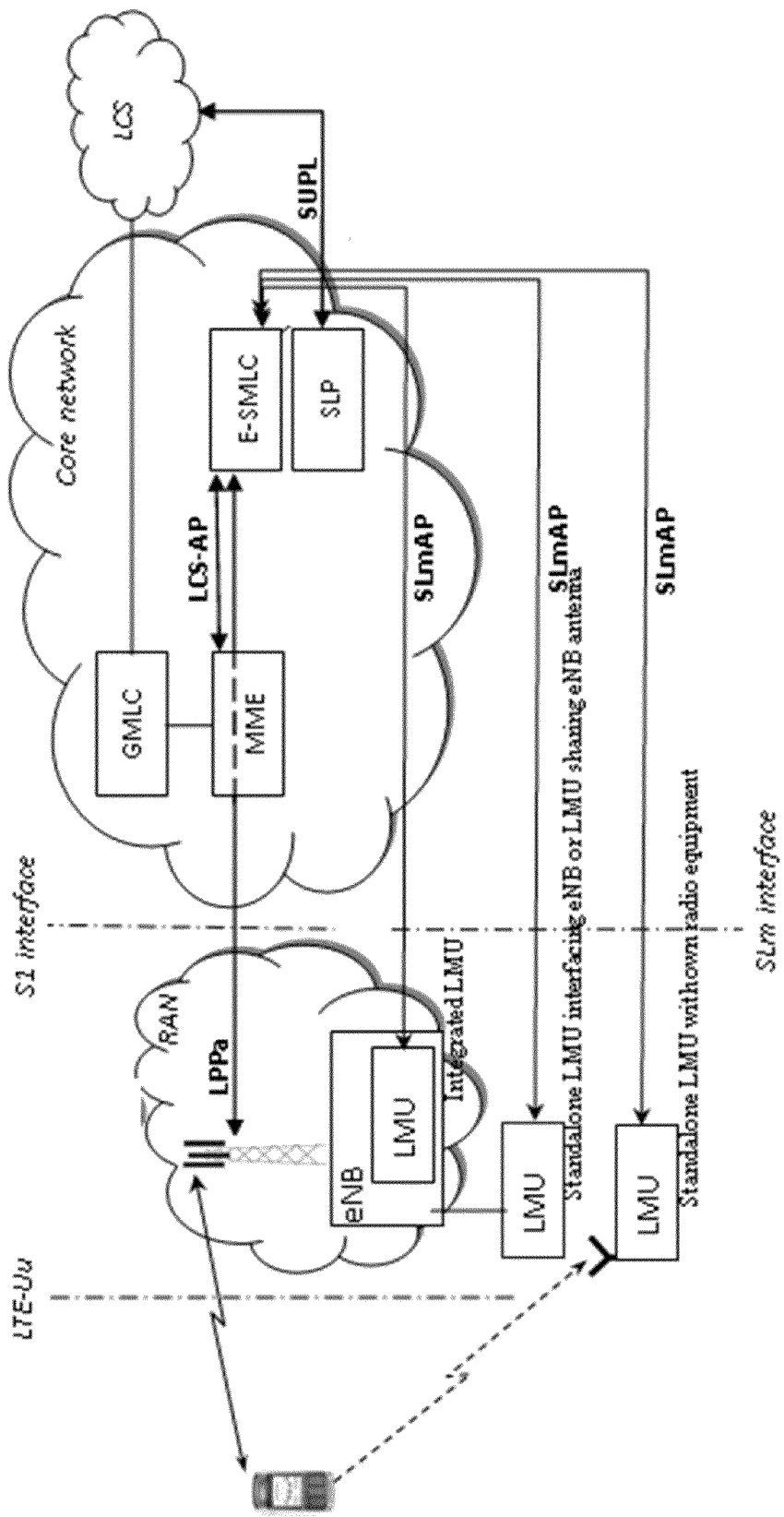
FIGS. 1a and 1b are overviews of the LTE positioning architecture according to prior art.
Figure 1B:
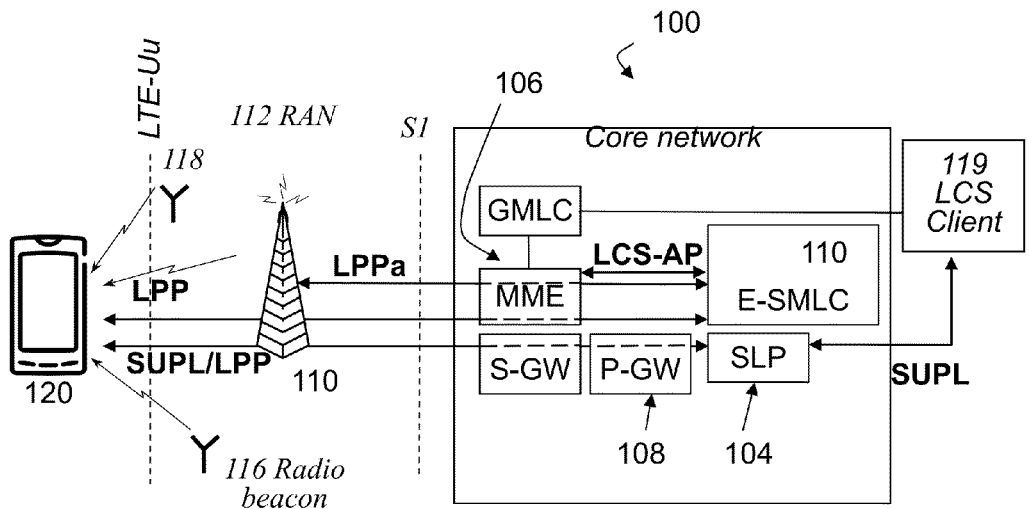

Furthermore, the radio communication system 100 comprises a positioning node 130, such as a computer executing a LCS server. The positioning node 130 may communicate 150 with the wireless device 120 using LPP. When the positioning node 130 may wish to communicate 151 with the radio network node 110 LLPa is used. Reference is made to the more detailed FIGS. 1a and 1b mentioned above.

Several embodiments described in detail below may be suitable for use in various wireless terminals, base stations, or both. It will be appreciated, of course, that the details of accompanying circuitry, including antennas, antenna interface circuits, radio-frequency circuits, and other control and base band circuits, will vary, depending on the specific application of the inventive techniques disclosed herein. Because these details are not necessary to a complete understanding of the embodiments, those details are generally omitted in the following discussion and in the accompanying figures.

A radio node is characterized by its ability to transmit and/or receive radio signals and it comprises at least a transmitting or receiving antenna. A radio node may be a UE or a radio network node (see corresponding descriptions).

A wireless device and UE are used interchangeably in the description. A UE may comprise any device equipped with a radio interface and capable of at least transmitting or receiving a radio signal from another radio node. A UE may also be capable of receiving signal and demodulate it. Note that even some radio network nodes, e.g., femto basestation (BS), aka home BS, may also be equipped with a UE-like interface. Some example of "UE" that are to be understood in a general sense are PDA, laptop, mobile, a tablet device, sensor, fixed relay, mobile relay, any radio network node equipped with a UE-like interface (e.g., small RBS, eNodeB, femto BS).

A radio network node is a radio node comprised in a radio communications network. A radio network node may be capable of receiving radio signals or transmitting radio signals in one or more frequencies, and may operate in single-RAT, multi-RAT or multi-standard mode. A radio network node, including eNodeB, RRH, RRU, or transmitting-only/receiving-only radio network nodes, may or may not create own cell. Some examples of radio network nodes not creating own cell are beacon devices transmitting configured radio signals or nodes receiving and performing measurements on certain signals (e.g., location measurement units, LMUs). It may also share a cell or the used cell ID with another radio node which creates own cell, it may operate in a cell sector or may be associated with a radio network node creating own cell. More than one cell or cell sectors (commonly named in the described embodiments by a generalized term "cell" which may be understood as a cell or its logical or geographical part) may be associated with one radio network node. Further, one or more serving cells (in DL and/or UL) may be configured for a UE, e.g., in a carrier aggregation system where a UE may have one Primary Cell (PCell) and one or more Secondary Cells (SCells). A cell may also be a virtual cell (e.g., characterized by a cell ID but not provide a full cell-like service) associated with a transmit node.

A network node may be any radio network node (see the corresponding description) or core network node. Some non-limiting examples of a network node are an eNodeB (also radio network node), RNC, positioning node, MME, PSAP, Self-Optimized Network (SON) node, MDT node, coordinating node, and O&M node.

Positioning node described in different embodiments is a node with positioning functionality. For example, for LTE it may be understood as a positioning platform in the user plane (e.g., SLP in LTE) or a positioning node in the control plane (e.g., E-SMLC in LTE). SLP may also consist of SLC and SPC, where SPC may also have a proprietary interface with E-SMLC. Positioning functionality may also be split among two or more nodes, e.g., there may be a gateway node between LMUs and E-SMLC, where the gateway node may be a radio base station or another network node; in this case, the term "positioning node" may relate to E-SMLC and the gateway node. In a testing environment, a positioning node may be a simulator or emulating test equipment. In some embodiments, positioning node may also be used interchangeably with "positioning server" which may be any node configured as a positioning server, e.g., a wireless device or a network node (e.g., eNodeB, E-SMLC or SLP).

The signaling described herein is either via direct links or logical links (e.g. via higher layer protocols and/or via one or more network and/or radio nodes). For example, signaling from a positioning node to a UE may also pass another network node, e.g., a radio network node.

The described embodiments are not limited to LTE, but may apply with any Radio Access Network (RAN), single- or multi-RAT. Some other RAT examples are LTE-Advanced, Universal Mobile Telecommunications System (UMTS), HSPA, GSM, cdma2000, WiMAX, and WiFi.

The term "subframe" used in the embodiments described herein (typically related to LTE) is an example resource in the time domain, and in general it may be any pre-defined time instance or time period.

The term "measuring node" used herein refers to a radio node performing the radio measurements of interest based on radio signals transmitted by other radio nodes. Some examples of the measuring nodes are a wireless device, an eNodeB, LMU, etc. The embodiments herein may apply to timing radio measurements (a.k.a. ranging measurements), which may be any one or more of: measurements performed in downlink, DL, measurements performed in uplink, UL, or measurements performed with respect to one or more of other radio nodes (e.g., with device-device communication or in a radio ad hoc network). Some examples of such timing measurements are TDOA, TOA, RSTD, UL RTOA, RTT, UE Rx-Tx, eNodeB Rx-Tx.

Figure 3:
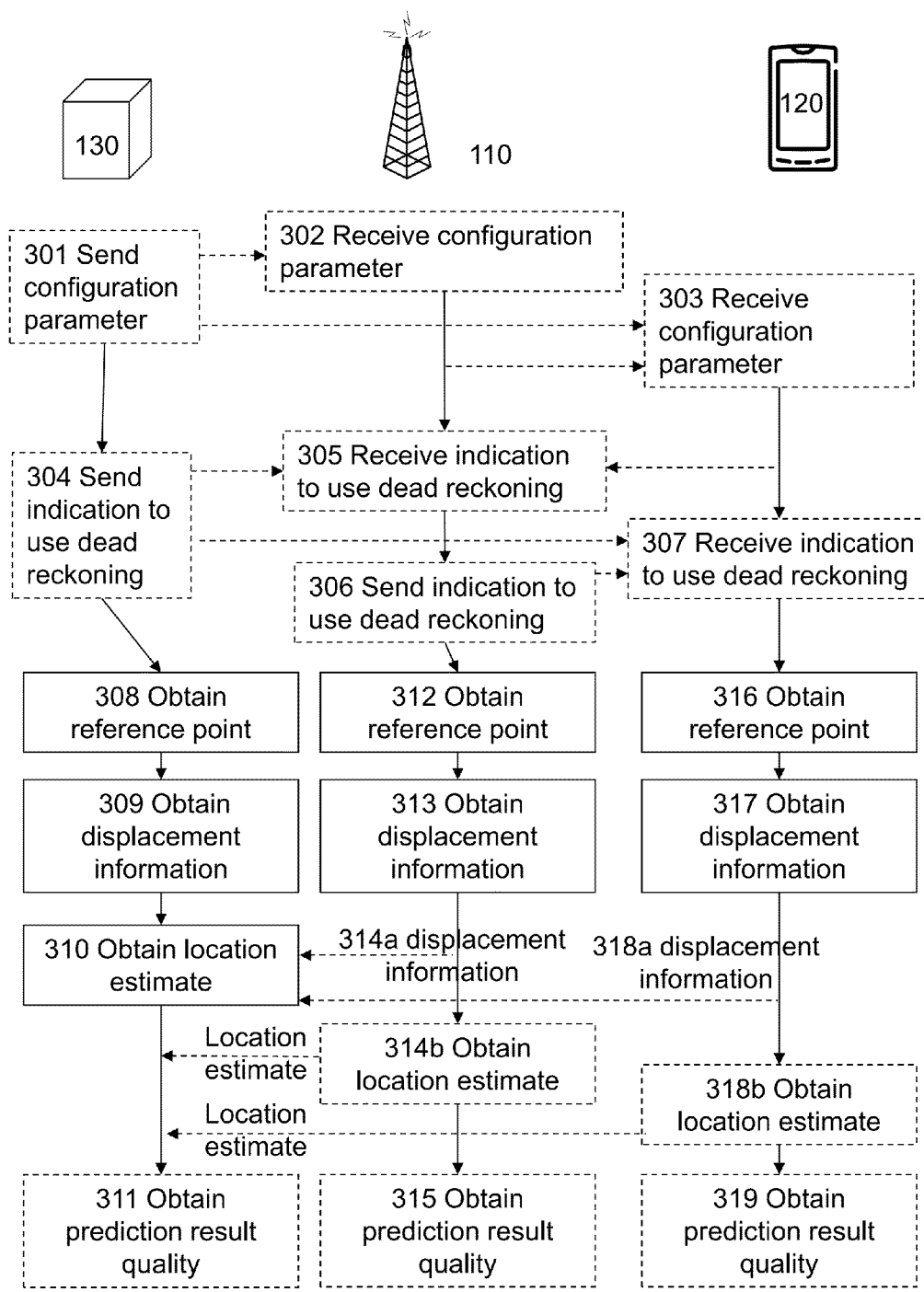
FIG. 3 is a schematic, combined signaling scheme and flowchart illustrating embodiments of the methods when performed in the radio communication system according to FIG. 2.

Now turning to FIG. 3, which illustrates exemplifying methods when implemented in the cellular telecommunication system 100 of FIG. 2. As illustrated by the following embodiments, the radio network node 110, the wireless device 120 and the positioning node 130 obtains a location estimate or enables the positioning node 130 to obtain the location estimate. The method performed in the radio network node 110 may be performed by a LCS client executed in the radio network node 110. The method performed in the wireless device 120 may be performed by a LCS client executed in the wireless device 120. The method performed in the positioning node 130 may be performed by a LCS server executed in the positioning node 130. The location estimate indicates a location of the target radio node 110, 120, such as an LCS target. The LCS target may be executed in the radio network node 110 or the wireless device 120. The wireless device 120 is operated to obtain the location estimate by use of functionality provided by a cellular telecommunication system 100.

The following actions may be performed in any suitable order.

Action 301

In order to configure dead reckoning in the target node 110, 120, the positioning node 130 may send, to the target radio node 110, 120, at least one configuration parameter relating to the estimation of the location estimate. The at least one configuration parameter may comprise one or more of:

requested number of consecutive predictions,
maximum number of consecutive predictions,
total prediction time span,
maximum total prediction time span, and the like.

Further examples of the configuration parameter are listed in the second paragraph of section "Configuration of Dead Reckoning" below.

In this manner, the positioning node 130 configures the target radio node 110, 120, such as the radio network node 110, the wireless device 120 or the like, to support dead reckoning for example by appropriate measurements.

Action 302

When the positioning node 130 has performed action 301, the radio network node 110 may receive 302, from the positioning node 130, the at least one configuration parameter for dead reckoning and/or assistance data for dead reckoning. See also section "Configuration of dead reckoning".

Action 303

Similarly, when the positioning node 130 has performed action 301, the wireless device 120 may receive, from the positioning node 130, the at least one configuration parameter for dead reckoning and/or assistance data for dead reckoning. See also section "Configuration of dead reckoning".

In the following actions 304 and 305 the positioning node controls and/or activates dead reckoning.

Action 304

The positioning node 130 may send an indication to start using dead reckoning to the target radio node 110, 120, such as the radio network node 110 or the wireless device 120. Action 304 may be performed in response to a request for determining a location estimate from a LCS client, e.g. the radio network node 110 or the wireless device 120. In action 305 below, the indication may be used by the target radio node 110, 120.

Action 305

When the positioning node 130 has performed action 304, the radio network node 110 may receive, from the positioning node 130, the indication to start using dead reckoning when performing action 314b below. In this manner, determination of the location estimate based on dead reckoning may be turned on or off, i.e. activated or de-activated.

In some examples, the radio network node 110 may receive the indication to start using dead reckoning from the wireless device 120. This may happen when the wireless device 120 executes the LCS Client. See also section "Controlling of dead reckoning".

Action 306

The radio network node 110 may send the indication to start using dead reckoning to the wireless device 120. As an example, this action may be performed when the radio network node 110 forwards the indication to start using dead reckoning from the positioning node 130 to the wireless device 120. That is to say, the positioning node 130 may order, or command, the wireless device 120 to perform measurements and report these measurements as required for performing for example action 310.

Action 307

The wireless device 120 may receive, from the positioning node 130 or the radio network node 110, the indication to start using dead reckoning when performing action 318*b*.

Action 308 to 310 below describe how the positioning node may determine the location estimate, which may be send to the LCS client, such as the wireless device 120 or the radio node 110.

Action 308

The positioning node 130 obtains a reference point for the target radio node 110, 120. In this manner, the positioning node 130 may for example be made aware of the last known, or estimated, position of the target radio node 110, 120. The reference point will be used in action 309 and 310. As an example, the positioning node 130 may receive the reference point from the target radio node 110, 120. See also for example section "reference point" below.

Action 309

The positioning node 130 obtains displacement information indicating displacement of the target radio node 110, 120. The displacement of the target radio node 110, 120 is specified in relation to the reference point obtained in action 308. As an example, the displacement information may be received from the radio network node 110 or the wireless device 120 as sent in actions 314*a* and 318*a*, respectively. See also for example section "displacement information" below.

Action 310

The positioning node 130 obtains, such as estimates, determines or calculates, the location estimate by dead reckoning based on the displacement information and the reference point. Dead reckoning may mean that the location estimate is dynamically predicted the based on the displacement information and the reference point. See also section "obtaining the location estimate based on dead reckoning".

In some embodiments, the positioning node 130 may perform hybrid positioning by combining the obtaining 310 of the location estimate by dead reckoning with a further positioning method. A few known positioning methods are mentioned in this document. All of these are possible to combine with dead reckoning. See also section "Hybrid positioning using dead reckoning".

Action 311

The positioning node 130 may obtain a prediction result quality for the location estimate. The prediction result quality may depend on one or more of the following parameters or characteristics:
  a number of consecutive location estimates,
  a time elapsed from the location estimate and/or the reference point,
  a displacement characteristic or maneuver characteristic,
  a quality of the reference point,
  a quality of the displacement information,
  a type of the radio node, and the like.

Further parameters and characteristics are listed in section "Examples" below. See also section "Estimating a location prediction and the prediction quality to further enhance positioning accuracy".

Action 312 to 314*a/b* below describe how the radio network node 110 may determine the location estimate, which may be send to the LCS client, such as the wireless device 120. In some examples, the radio network node 110 merely sends the displacement information to the positioning node 130, see action 314*a*.

Action 312

The radio network node 110 obtains 312 a reference point for the target radio node 110, 120. According to various examples, the radio network node 110 may:
  receive the reference point from the target radio node 110, 120, such as the wireless device 120;
  determine the reference point, such as by storing a last known position determined by using any positioning method including dead reckoning;
  receive the reference point from another network node, such as the positioning node 130 or another radio network node (not shown);
  obtain the reference point according to a pre-define rule, such as setting the reference point to an average of a set of previous known positions; or
  a combination thereof.

See also for example section "reference point" below.

Action 313

The radio network node 110 obtains displacement information indicating displacement of the target radio node 110, 120. The displacement information may be defined in relation to the reference point. According to various examples, the radio network node 110 may:
  receive the displacement information from the target radio node 110, 120, such as the wireless device 120;
  determine the displacement information;
  receive the displacement information from another network node;
  obtain the displacement information according to a pre-defined rule;
  or a combination thereof.

See also for example section "displacement information" below.

Action 314*a*

The radio network node 110 sends at least the displacement information to another network node, such as the positioning node 130. Thereby, the positioning node 130 may perform action 310.

Action 314*b*

Alternatively or additionally to action 314*a*, the radio network node 110 obtains, such as determines, estimates or calculates, the location estimate by dead reckoning based on the displacement information and the reference point. As mentioned, dead reckoning may mean that the location estimate is dynamically predicted the based on the displacement information and the reference point. See also section "obtaining the location estimate based on dead reckoning".

In some examples, the radio network node 110 may send the obtained location estimate to the positioning node 130.

In some embodiments, the radio network node 110 may perform hybrid positioning by combining the obtaining 314*b* of the location estimate by dead reckoning with a further positioning method. As mentioned, a few known positioning methods are mentioned in this document. All of these are possible to combine with dead reckoning. See also section "Hybrid positioning using dead reckoning".

Action 315

The radio network node 110 may obtain a prediction result quality for the location estimate. The prediction result quality may depend on one or more of the following parameters or characteristics:
  a number of consecutive location estimates,
  a time elapsed from the location estimate and/or the reference point,
  a displacement characteristic or maneuver characteristic,
  a quality of the reference point,
  a quality of the displacement information,
  a type of the radio node, and the like.

As mentioned, further parameters and characteristics are listed in section "Examples" below. See also section "Estimating a location prediction and the prediction quality to further enhance positioning accuracy".

Action 316 to 318a/b below describe how the wireless device 120 may determine the location estimate, which may be send to the LCS client, such as the wireless device 120. In some examples, the wireless device 120 merely sends the displacement information to the positioning node 130, see action 318a.

Action 316

The wireless device 120 obtains a reference point for the wireless device 120. According to various examples, the wireless device 120 may:

receive the reference point from the wireless device 120, or another wireless device (not shown);

determine the reference point;

receive the reference point from another node, such as the radio network node 110, another wireless device or the positioning node 130;

obtain the reference point according to a pre-define rule;

or a combination thereof.

See also section "obtaining the location estimate based on dead reckoning" as well as for example section "reference point" below.

Action 317

The wireless device 120 obtains displacement information indicating displacement, in relation to the reference point, of the wireless device 120. According to various example, the wireless device 120 may:

receive the displacement information from the wireless device 120, or another wireless device (not shown);

determine the displacement information;

receive the displacement information from another node, such as the radio network node 110, another wireless device or the positioning node 130;

obtain the displacement information according to a pre-defined rule; or a combination thereof.

See also for example section "displacement information" below.

Action 318a

The wireless device 120 sends at least the displacement information to another network node, such as the positioning node 130.

Action 318b

Alternatively or additionally to action 318a, the wireless device 120 obtains 318 the location estimate by dead reckoning based on the displacement information and the reference point. As mentioned, dead reckoning may mean that the location estimate is dynamically predicted the based on the displacement information and the reference point. See also section "obtaining the location estimate based on dead reckoning".

In some examples, the wireless device 120 may send the obtained location estimate to the positioning node 130.

In some embodiments, the wireless device 120 may perform hybrid positioning by combining the obtaining 318b of the location estimate by dead reckoning with a further positioning method. As mentioned, a few known positioning methods are mentioned in this document. All of these are possible to combine with dead reckoning. See also section "Hybrid positioning using dead reckoning".

Action 319

The wireless device 120 may obtain a prediction result quality for the location estimate. The prediction result quality may depend on one or more of the following parameters or characteristics:

a number of consecutive location estimates, a time elapsed from the location estimate and/or the reference point, a displacement characteristic or maneuver characteristic, a quality of the reference point, a quality of the displacement information, a type of the radio node, and the like.

As mentioned, further parameters and characteristics are listed in section "Examples" below. See also section "Estimating a location prediction and the prediction quality to further enhance positioning accuracy".

Some of the advantages provided by some embodiment herein are:

Enabling dead reckoning in LTE,

Network side consideration of dead reckoning is also disclosed which can improve quality and availability of location service.

By applying dead reckoning, it is much easier and of practical value to use a proprietary solution on network self-diagnostics and AECID self-learning. Similar approaches can be applied to Minimization of Drive Tests (MDT).

Methods for controlling positioning QoS for dead reckoning. Better positioning QoS estimate is obtained which make dead reckoning more applicable for location service.

Solution on control and arrangement of dead reckoning at network side makes dead reckoning of more practical value.

Possibility to use dead reckoning in combination with other positioning technologies Methods for adaptively controlling the apparatus used for obtaining non-radio based displacement data At least in some embodiments, unless explicitly stated, the terms "dead reckoning" and "dynamic positioning/location based at least on displacement information" may be used interchangeably throughout the description. Another example of dead reckoning technique herein is interpolation and/or extrapolation based positioning utilizing displacement data. There may be different categories of dead reckoning positioning, e.g., it may be based on any of the following:

displacement data based on radio signal measurements (different measurement types and signal types may be involved too) (e.g., network-based UE speed or velocity measurements based on measurements of the signals transmitted by the UE), displacement data not based on BS or UE radio signal measurements and provided by internal apparatus (e.g., velocity data based on integrated inertial sensors, barometer, speedometer, thermometer, etc.), displacement data partly based on BS or UE radio signal measurements provided by internal apparatus, displacement data not based on BS or UE radio signal measurements provided by external apparatus, displacement data partly based on BS or UE radio signal measurements provided by external apparatus, any combination of the above.

Velocity Information

In the current 3GPP standard, it is possible to provide velocity information by UE to E-SMLC via LPP as a part of the location information, e.g., as depicted below.

```
CommonIEsProvideLocationInformation ::= SEQUENCE {
    LocationEstimate        LocationCoordinates     OPTIONAL,
    velocityEstimate        Velocity                OPTIONAL,
    locationError           LocationError           OPTIONAL,
    ...
}
Velocity ::= CHOICE {
    horizontalVelocity                              HorizontalVelocity,
    horizontalWithVerticalVelocity                  HorizontalWithVerticalVelocity,
    horizontalVelocityWithUncertainty               HorizontalVelocityWithUncertainty,
    horizontalWithVerticalVelocityAndUncertainty
                                                    HorizontalWithVerticalVelocityAndUncertainty,
    ...
}
```

However, the prior-art estimation of the provided velocity is not very useful for dead reckoning since the network is not aware how (e.g., what is the averaging period) and when/in which exact location the estimation is done, even if it is reported together with the location estimation. Further, the use of the velocity is not specified for dead reckoning.

Obtaining the Location Estimate Based on Dead Reckoning

This embodiment may be a standalone solution or may be used in combination with other Solutions described herein.

According to this embodiment, dead reckoning or a dynamic location prediction technique based at least on displacement data/information (e.g., velocity with known timestamp(s) see more details described below) is used to obtain a location estimate or sequence of location estimates. The obtaining of the location estimate of the sequence thereof may take place in the LCS target (e.g., a wireless device) or in a network node (e.g., eNodeB, LMU, RNC, positioning node such as E-SMLC or SLP in LTE, MDT node, SON node, etc.); hence the methods of obtaining location estimate based on dead reckoning may be network-side or network-based methods but there may be device-based methods too.

The displacement may be obtained by the estimating node in different ways, e.g., by any one or more of: received from another node (the target wireless device, its serving eNodeB, MDT, SON, from positioning node), obtaining from an internal or external memory or a database (e.g., when displacement is a typical displacement based on the statistics for multiple wireless devices), from sensors, by a predefined rule or a function (e.g., interpolation or extrapolation function), etc.

In a first embodiment, the obtained location estimate corresponds to a physical location for which the displacement information was obtained.

In one example, the obtained location information is a second (refined) location information associated with the physical location (if the displacement information has been provided together with a first location information of the same physical location). The second location information may be more accurate (e.g., smaller uncertainty) or more complete (e.g., the first location is 2D location whilst the second location is 3D location) than the first location information.

In another example, the displacement information associated with the physical location has been provided without corresponding location information (e.g., the reference point is unknown for the physical location).

In a second embodiment, the obtained location estimate corresponds to a time instance that has occurred or will occur later than the time instance when the displacement information was obtained.

In a third embodiment, the first and the second embodiments may be combined, e.g., the first embodiment may be an intermediate step in the second embodiment.

According to a fourth embodiment, the displacement information is associated with at least two points, whilst the location of at most one of the points is known (e.g., at most one of the points is a reference point with an uncertainty above a threshold)—see also Example 5 below.

In one example, the displacement may be forward (e.g., in time and/or space) displacement or backward (e.g., in time and/or space) displacement, e.g., a backward displacement may be a vector pointing from the current location to a previous in time location and a forward displacement may be a vector pointing from the previous in time location to the current location.

The signalling means for signalling the displacement information may comprise also an indication on whether the displacement is a forward or a backward displacement, e.g., via explicitly indicating absolute or relative time or sequence in time or following a pre-defined rule.

Reference Point

The "reference point" is a 2D or 3D geographical point with a known or pre-defined location (absolute or relative location) or location estimate (absolute or relative). The reference point may be described by different means:
  geographical coordinates,
  Universal Geographical Area Description (GAD) shapes (see e.g. 32.032),
  Alternative formats, e.g.,
    String address (see e.g., [1]),
    An image or a picture representation of the location itself or which has been taken at the location towards other recognizable objects.

Typically the reference point would be a high-accuracy location. The reference point may also have uncertainty or a combination of uncertainty and confidence associated with it. In one example, the confidence level may be pre-defined.

In one example, the uncertainty may be obtained in a relevant node for any one of the formats or it may be obtained via conversion of one format to another format (for which the uncertainty may be obtained), e.g., the uncertainty may be obtained for an image-based location format directly or the image-based location may be associated with or transformed to a GAD shape for which the corresponding uncertainty is obtained through the association or transformation. Further, a point may be determined/qualified to be a reference point if it's expected or estimated uncertainty is below a threshold.

The reference point may further comprise, e.g.,
  a positioning result for the wireless device (e.g., using any one or more of the positioning methods such as GNSS, A-GNSS, network-based positioning, UTDOA, OTDOA, hybrid positioning, etc.), or a location of an object in proximity of the wireless device (e.g., a radio network node, another wireless device, a beacon device, a sensor, a receiver receiving radio signals from the wireless device, a transmitter transmitting radio signals detected by the wireless device, an object not comprised in the wireless communication network e.g. a shop or a kiosk), or a configured location (e.g., manually entered address information).

The reference location may be obtained by a wireless device or a network node e.g. by performing calculation of a location, extracting location information from a database or internal/external memory source, or it could be received from another network node or it could be received from the wireless device being positioned or even another wireless device.

A reference point may e.g. be obtained periodically (e.g., scheduled by the network node) or according to a pre-defined rule and/or upon a triggering event or a condition, e.g. after every or a certain number or amount of changes of course or speed (e.g., the change is above a threshold); after a certain distance; at every or certain activity states (e.g., when in DRX active and performing measurements); after a cell change. Other examples of obtaining a reference point is upon a request from the network node or another node, or it could be autonomously decided.

Displacement Information

A displacement herein refers to a displacement with respect to a point (e.g., a physical location) which may or may not be a reference location (e.g., the location of the point may be known, may be not known or may be known but with a high uncertainty).

The displacement may comprise or be indicative of any one or more of: distance, coordinate change or relative coordinates, height change, pressure change, temperature change, speed or speed change, velocity, change in a timing measurement (example timing measurements: Timing Advance, Time of Arrival, Time Difference of Arrival, one-way propagation delay, etc.).

The displacement information may further comprise any one or more of:
  one or a set of displacements,
  an aggregate displacement (e.g., a displacement vector which may be a sum of several displacement vectors or a vector between two physical locations at most one of which has a known location),
  parameters from which the displacement can be derived (e.g., distance and direction; speed, time and direction, velocity vector and time, number of steps, step length, etc.),
    in one example, velocity vector for a positioning prediction is an average vector or a sum of all velocity vectors from the time when a reference location was obtained, which is not the case in standard specification 3GPP TS 36.355 and hence using the prior-art velocity information is not possible for network-based dead reckoning due to the lost relation to the relative location
    in another example, velocity vector describes speed and coordinates change between two physical locations at most one of which has a known location
    in yet another example, velocity may be horizontal and/or vertical; it may also be described with a velocity shape as in 3GPP TS 23.032, but with a new velocity definition suitable for dead reckoning (e.g., associated with two physical locations),
  route or a target destination information (e.g., without a route, along a route or in the end of a route)

a typical or an expected displacement (which may also be associated with a certain probability) for the wireless device being positioned, e.g., from historical data or statistics for the same wireless device or other wireless devices in the area.

At least some of the displacement information may also comprise the information obtained by using, e.g., speed sensors, direction sensors, odometer, accelerometer (measuring acceleration), gyroscope (measuring angular velocity), magnetometer (measuring magnetic flux), pressure and temperature sensors, radio receiver performing measurements (e.g., timing measurements).

The displacement information may be obtained by the wireless device or a network node in different ways, e.g., by one or more of:
  from the wireless device being positioned or from another device,
  autonomously by the node (e.g., network-based determination of the speed of the wireless device),
  from another network node (e.g., serving eNodeB),
  from an apparatus or software performing non-radio based measurements,
  according to a pre-defined rule.

Positioning result obtained with dead reckoning may comprise one or more absolute or relative locations, or predictions obtained based on dead reckoning. The obtained location may comprise also a time stamp associated with the prediction. The obtained location may be described, e.g., by at least one of:
  geographical coordinates,
  Universal Geographical Area Description (GAD) shapes (see e.g. TS 23.032),
  Alternative formats, e.g.,
    String address (see e.g., [1]),
    An image or a picture representation of the location itself or which has been taken at the location towards other recognizable objects.

The description format of the obtained location may or may not be different from the format of a reference point used for obtaining the result.

The result may further comprise, e.g.,
  The obtained location may also comprise uncertainty or a combination of uncertainty and confidence information, disregard of the location information description format. In one example, the confidence level may be pre-defined,
  Reference location information (e.g., last available reference location information; see corresponding section on the reference point definition),
  Time associated with a reference location information (e.g., the last available reference location),
  Number of location predictions after the last available reference location information or the time elapsed since an available reference location (e.g., the last available reference location),
  Positioning method used for obtaining reference location information (e.g., GNSS, OTDOA, pattern matching or Radio Frequency (RF) fingerprinting, UTDOA, hybrid, etc.),
  Indication of measurement types used for obtaining the prediction, e.g., radio signal measurements, velocity, direction measurements, sensor measurements, satellite measurements,
  Cell ID or area identification (e.g., local area or tracking area).

A positioning result obtained using dead reckoning positioning may be used for various purpose, e.g., for any one or more of:

signalling the result to another node (e.g., to LCS Client, PSAP, wireless device, network node, eNodeB, etc.),
hybrid positioning with at least one other positioning method (e.g., AECID),
wireless device tracking, navigation applications and navigation systems, including indoor navigation,
mobility enhancement, e.g., for handover prediction
pathloss calculation/prediction (e.g., with respect to one or more cells),
power control,
measurement configuration (e.g., UL measurement configuration for UL positioning),
positioning assistance data configuration,
MDT, SON, RRM and network planning tasks,

EXAMPLES

The embodiments described in the previous sections may be combined in any way. Some non-limiting examples are:

Example 1 at least one of the reference point format (e.g., used as input to or in the process of dead reckoning) and the prediction result format is in one of the alternative formats. As described above, uncertainty and confidence may also be associated with the formats. Further, transformation rules may be also used to convert between the alternative format and the traditional format (e.g., coordinates or GAD shape)

Example 2 a prediction (an intermediate or final location result obtained with dead reckoning) quality estimate is obtained for a prediction result obtained by dead reckoning, wherein the prediction result is described in any format (e.g., by a traditional or alternative format). The prediction quality estimate may comprise accuracy or uncertainty of the prediction result and may also comprise the corresponding confidence level, e.g., some examples: total prediction result accuracy or uncertainty, confidence, horizontal accuracy or uncertainty, horizontal confidence, vertical accuracy or uncertainty, vertical confidence, response time spent for obtaining a positioning result based on dead reckoning, prediction/measurement time spent for obtaining the prediction.

The prediction result quality may characterize one or more predictions obtained by dead reckoning
The prediction result quality may be obtained by one or any combination of: a pre-defined rule, a function, using a mapping table, or based on the prediction quality statistics in similar conditions. The prediction result quality may depend, e.g., on any one or more of parameters or characteristics:
Number of consecutive predictions,
The time elapsed from the last prediction and/or the last known reference location,
A displacement characteristic or maneuver characteristic (e.g., wireless device speed, acceleration, number of turns),
The quality (e.g., uncertainty and confidence) of the reference point(s) used by dead reckoning
The quality of the displacement information (e.g., velocity accuracy, sensor measurement accuracy and granularity, etc.)
Wireless device type,
Type of the vehicle associated with the wireless device,
Movement type (e.g., walking, running, cycling, driving, etc.)
Different movement types may lead to different location uncertainty after a certain displacement due to accessiblity and terrain reasons. For example, many places can be accessible by walking but not by driving, the accuracy/reliability of dead reckoning degrades much for walking but not for driving.
Environment (e.g. urban/rural, road/roadless, in-building/out-building, etc.)
Historical QoS (e.g. in a certain area or for a certain terminal type or even a certain terminal) or statistics-based QoS for other devices,
History movement behavior (e.g. stay inside a building at working hours);
In one example, the prediction result quality may be a linear function of the one or more the parameters and characteristics above and the estimated quality of the previous prediction obtained in the prediction sequence obtained by dead reckoning, e.g.
An estimated quality characteristic (e.g. uncertainty) is a scaling of the corresponding quality characteristic of the previous prediction, being scaled with a coefficient associated with the time elapsed since the previous prediction and/or speed;
In one example, the prediction result quality may be obtained using Solution 2 described below.
The prediction result quality may be used in different ways, e.g., signaled to another node, stored in a database, used in the statistics to predict the positioning QoS for dead reckoning during the positioning methods selection (see e.g. Example 4), dynamically controlling the quality of the positioning result obtained with dead reckoning algorithm and/or the dead reckoning algorithm (see e.g. Example 3)
One advantage of the dead reckoning approach described herein, at least in some examples, is that it allows to base positioning not only on radio signal measurements (which may be used, e.g. for obtaining reference locations, and may or may not be used for obtaining displacement data) but also on displacement data not based on cellular-system radio signals and thereby to reduce the negative impact on positioning accuracy the effect of multipath and radio channel variation. The exact combination of the two (e.g., the sets of radio measurements and non-radio based displacement data) may be adaptively controlled, responsive e.g. to the radio environment conditions and target positioning QoS.

Example 3

On-line controlling positioning result quality with dead reckoning or the dead reckoning algorithm parameters, e.g.,
Steps: Obtain target LCS quality, obtain the prediction quality (see, e.g., Example 2), compare the obtained quality with a target quality (e.g., the target LCS quality received by the positioning node), and accept the prediction result if the obtained quality meets the target QoS quality or is within a margin and reject the prediction otherwise. Upon rejection the last prediction result, e.g. any of the following decisions may be made:
Stop dead reckoning algorithm (the previous accepted prediction result may be the final positioning result reported with dead reckoning for the wireless device), Change or optimize at least one parameter of the dead reckoning algorithm while proceeding (or repeating the previous step) with the at least one optimized parameter, Change or optimize at least one parameter related to obtaining the displacement data (e.g., sensor sampling rate or target QoS of sensor measurements used for obtaining displacement data) and/or the apparatus (e.g., an inertial sensor) used for obtaining the displacement data, Use hybrid positioning to improve the prediction result obtained with dead reckoning (see e.g. Solution 4).

Some examples of the parameters of the dead reckoning algorithm that may be optimized (more examples of parameters may be found in Solutions 2-4 or other examples in Solution 1) are:

time interval between two predictions (e.g., can reduce if the uncertainty is above a threshold), the level of detail of the displacement information and the amount/set of the displacement data used in dead reckoning (e.g., more displacement data, of the same or different type, may be needed if the obtained uncertainty is above a threshold), The maximum number of consecutive predictions with dead reckoning for this or another wireless device.

Example 4

Positioning method selection from a set of positioning methods comprising at least two positioning methods one of which is dead reckoning, e.g., Obtain target positioning QoS (e.g., positioning node receiving LCS QoS from MME in LTE or a wireless device receiving LCS QoS from positioning node or a wireless device receiving LCS QoS from an application in the wireless device), obtain expected positioning result QoS for a wireless device (e.g., in the area and/or specific condition and/or specific device/vehicle type), compare the obtained expected QoS with the target QoS and select dead reckoning positioning method if the expected QoS meets the target QoS or is within a margin otherwise consider selecting another positioning method or consider a positioning method which is a hybrid positioning using dead reckoning (see e.g. Solution 4).

The expected QoS may be obtained based on the collected QoS statistics for dead reckoning for other wireless devices (see e.g. Example 2)

The expected QoS may comprise the best possible estimate of the QoS based on the information about the wireless target (e.g., speed, vehicle type, wireless device, environment type such as indoor/rural/highway/urban streets, etc.)

Example 5 the displacement information is an estimated (e.g., based on sensors and/or speed) location difference between a reference location at time t0 and a location estimate at time t1.

The location difference may comprise a sum of location difference vectors between t0 and t1 or a as a sum of velocity vectors between t0 and t1.

The estimated location difference may be signaled by the wireless device to the positioning node Depending on the node obtaining the displacement data, the estimating the location difference requires in the wireless device or in the network node (e.g., serving eNodeB or positioning node) tracking of the location changes and/or the factors associated with the location changes (e.g., direction, speed, etc.) between t0 and t1, in order to calculate the displacement.

Estimating a Location Prediction and the Prediction Quality to Further Enhance Positioning Accuracy This embodiment may be a standalone solution or may be used in combination with other solutions described herein.

In this embodiment, a method of estimating quality of a prediction obtained with dead reckoning is described. The example steps may comprise, e.g., 1. Obtaining at least one reference point
2. Calculate measurement location and its uncertainty
3. Use the measurement location to enhance mobile positioning The steps are described in more detail below.

Step 1: Obtaining at Least One Reference Point

According to this embodiment, at least one reference point is obtained.

A reference point herein may be viewed as a starting point for a dead reckoning method. One or more predictions obtained by the method may be in the forward and/or backward direction (e.g., in time and/or space) with respect to this starting point.

In 3GPP, more than one positioning methods can be performed in either sequence or parallel. After a positioning flow, which carried out more than one positioning method, the below information may be available:

Method1: (loc1, loc_un1, t1, t_un1, vel1, vel_un1),
Method2: (loc2, loc_un2, t2, t_un2, vel2, vel_un2),
Method3: (loc3, loc_un3, t3, t_un3, vel3, vel_un3),
where "loc" is a location estimate of a specific positioning method, "loc_un" is the location uncertainty, which may be associated with an arbitrary shape e.g. circle/ellipse/polygon etc, "t" is the moment when that location estimate or relevant measurement is available at the terminal or network node side, "t_un": the time moment may also be with uncertainty "t_un", "vel" is velocity, e.g., reported by terminal or calculated by network node, "vel_un" is velocity uncertainty.

In a simple case, "loc_un" (e.g., "loc_un1") is a 2D circle. If velocity can be assumed to be stable over a period of a location session, the velocity estimate "vel_est" may be deduced according to a rule, e.g., depending on velocity uncertainties collected via multiple positioning methods from the below logic if velocity is available for more than one positioning method:

```
IF vel_un1<vel_un2,
    vel_est = vel1
ELSE
    vel_est = vel2
END
```

Combining uncertainties for multiple characteristics (e.g., for location and velocity or speed) into a total/combined uncertainty and comparing the total uncertainties to get reference point (loc_ref), e.g., as below:

```
IF (loc_un1+f(t_un1,vel_est)) > (loc_un2+f(t_un2,vel_est))
    loc_ref = loc2
    t_ref = t2
ELSE
    loc_ref = loc1
    t_ref = t1
END
``` i.e. the method with minimum total uncertainty will be trusted more.

In the above, f(t_un,vel_est) is a function of the time uncertainty and velocity estimate. In one example, the function may be linearly increasing with t_un.

"Total uncertainty" is used above as a criterion for determining a reference point. However, the term "total uncertainty" may be extended to cover also some other factors to better reflect location accuracy of dead reckoning in a more complete way. The more complete "total uncertainty" is therefore not only useful for Solution 2 but also of a generic value for dead reckoning positioning method and thus can be used in combination with Solutions described in this specification.

In case a location shape defined by loc_un1 is not isotropic, e.g. not an ellipse or arc, vector t_un1*vel1 shall be projected onto the location shape to determine the accuracy degradation based on the reported time uncertainty and velocity. Such process/calculation is mathematically straightforward.

Note velocity or speed can be calculated by a wireless device or a network node (see e.g. Section 6.1 for generalizations).

Step 2: Calculate the Measurement Location and its Uncertainty

According to this embodiment, a measurement location is calculated.

A measurement location herein is a location where a certain measurement was made, e.g., power-based radio measurement (signal strength or quality), timing measurement (TDOA/TOA measurement or TA/RTT measurement) or velocity measurement was taken. In other embodiments described herein, it corresponds to a prediction in a physical location for which displacement information is available but not the reference location (see e.g. Solution 1).

Dead reckoning based on reference point, velocity (e.g. vel_est) and a certain time gap can give an estimate of measurement location. An example of such reckoning is:

$td = t\_meas - t\_ref$ $loc\_meas = loc\_ref + vel\_est * td$ $loc\_meas\_un = loc\_un + vel\_est\_un * td,$ where "t_meas" is the time when the measurement was made. Note that vel_est*td may be already comprised in the displacement information (see e.g. Example 5 in Solution 1).

The measurement time may be pre-defined or obtained by a pre-defined rule, e.g., the beginning of the next subframe or of the subframe with a certain number. The measurement time may also be found using an internal timer or a clock.

For example, in OTDOA, "t_meas" is carried by systemFrameNumber as in below ASN.1 in LPP, which is the time associated with the performed measurement.

```
-- ASN1START
OTDOA-SignalMeasurementInformation ::= SEQUENCE {
    systemFrameNumber    BIT STRING (SIZE (10)),
    physCellIdRef        INTEGER (0..503),
    cellGlobalIdRef      ECGI                       OPTIONAL,
    earfcnRef            ARFCN-ValueEUTRA           OPTIONAL,
    referenceQuality     OTDOA-MeasQuality          OPTIONAL,
    neighbourMeasurementList    NeighbourMeasurementList,
    ...
}
NeighbourMeasurementList ::= SEQUENCE (SIZE(1..24)) OF NeighbourMeasurementeElement
NeighbourMeasurementeElement ::= SEQUENCE {
    physCellIdNeighbor   INTEGER (0..503),
    cellGlobalIdNeighbor ECGI                       OPTIONAL,
    earfcnNeighbour      ARFCN-ValueEUTRA           OPTIONAL,
    rstd                 INTEGER (0..12711),
    rstd-Quality         OTDOA-MeasQuality,
    ...
}
-- ASN1STOP
```

For AGPS, "t_meas" is carried by measurementReferenceTime as in below ASN.1 in LPP.

```
-- ASN1START
GNSS-SignalMeasurementInformation ::= SEQUENCE {
    measurementReferenceTime    MeasurementReferenceTime,
    gnss-MeasurementList        GNSS-MeasurementList,
    ...
}
-- ASN1STOP
```

For ECID, "t_meas" is carried by systemFrameNumber as in below ASN.1 in LPP.

```
-- ASN1START
ECID-SignalMeasurementInformation ::= SEQUENCE {
    servingCellMeasuredResults    MeasuredResultsElement OPTIONAL,
    measuredResultsList           MeasuredResultsList,
    ...
}
MeasuredResultsList ::= SEQUENCE (SIZE (1..32)) OF MeasuredResultsElement
MeasuredResultsElement ::= SEQUENCE {
    physCellId          INTEGER (0..503),
    cellGlobalId        CellGlobalIdEUTRA-AndUTRA  OPTIONAL,
    arfcnEUTRA          ARFCN-ValueEUTRA,
    systemFrameNumber
                        BIT STRING (SIZE (10))     OPTIONAL,
    rsrp-Result         INTEGER (0..97)            OPTIONAL,
    rsrq-Result         INTEGER (0..34)            OPTIONAL,
    ue-RxTXTimeDiff     INTEGER (0..4095)          OPTIONAL,
    ...
}
-- ASN1STOP
```

Note that SystemFrameNumber has ambituity of 10.24 seconds in LTE this is however not a problem as network node (e.g. ESMLC which has eNB timing information) can do disambiguation since OTDOA and ECID are normally quick.

It is worth noting that the reckoning can be "backward" i.e. deduce a historical location of terminal based on a later location.

Step 3: Use the Measurement Location to Enhance Mobile Positioning

This part of the description provides some examples of using the measurement location to enhance mobile positioning. Other examples may also be found in Solution 1, 3, and 4.

As mentioned earlier, in the current 3GPP standard, two or more positioning method flows can be triggered by location server in parallel. However, this does not mean that the actual positioning measurements are to be performed simultaneously. For example AGPS and OTDOA can be triggered at the same time, but due to their different positioning principle and response time, it is very unlikely that the OTDOA RSTD measurements and AGPS pseudorange measurements can be obtained at the same moment. To determine the "measurement location" is of obvious value for below usages:
1) Use the deduced OTDOA RSTD measurement location to estimate Base station timing error and also base station location error, a compensation of the errors can further enhance mobile positioning accuracy.
2) Use the deduced ECID measurement location as ground truth to pair with radio measurements so can improve quality of reference data for better fingerprinting positioning. ("radio measurement" in this context refers to measurement on radio interface including but not limited to TA/RTT/Neighbour cell signal strength/quality etc.)

Hybrid Positioning Using Dead Reckoning

This embodiment may be a standalone solution or may be used in combination with other solutions disclosed herein.

According to the embodiments, described in this section of the specification, positioning based on dead reckoning (first positioning method) is used jointly with at least one of:
- a second positioning method (e.g., AECID, OTDOA, UTDOA, GNSS, E-CID, CID, pattern matching, etc.) used for the same wireless device, where the second positioning method may or may not be run in parallel with the first method,
- historical data,
- route information (e.g., any of: the entire route, one or more candidate routes, a final destination).

The methods may be implemented in any node which may benefit from implementing the embodiments. A positioning prediction obtained by the first method is further referred to as the first positioning results, and a positioning result obtained by the second positioning method is further referred to as the second positioning result.

Some examples of joint usage are as follows,
Using one of the first and second positioning results for verifying the other one of the first and second results, e.g.
  In one example, the verifying may comprise comparing the first and the second results and accept the result being verified if it is within a certain distance from the result used for verification.
Combining the first and the second positioning results, e.g.
  The second positioning result may be obtained by the node in different ways, e.g., by performing measurements, calculating the result, or receiving it from a wireless device or a network node
  In one example, the combining may comprise combing the first and the second results according to a predefined rule or by applying a function or an operator. Some examples of the function/operator are:
    Select the positioning result with the smallest uncertainty (for the same confidence level) as the final positioning result
    Obtaining the final positioning result as a weighted combination of the first and the second positioning results, where the weights may be e.g. equal or prioritizing one of the positioning results (e.g., the one with a better accuracy and/or latest in time).
Combining the first positioning result with at least one radio signal measurement performed by a radio node (e.g., the wireless device, another wireless device, a radio network node such as eNodeB or LMU, etc.), e.g.,
  The measurement result may be obtained by the node in different ways, e.g., by performing measurements on one or more radio signals or receiving it from a wireless device or from a network node
  Some example measurements are: AoA, received signal strength or quality, pathloss estimation, timing measurements (e.g., RTT, Rx-Tx, TDOA, TOA, RSTD, UL RTOA, propagation delay, etc.)
  In one example, the combining may comprise obtaining a final positioning result based on the first positioning result and the measurement result
  In another example, the combining may comprise creating a fingerprint, e.g., using the first result as the high-accuracy location and the measurement result as the measurement associated with the location
Examples of how exactly combine with measurements.
Using the first positioning result as a fingerprint, e.g., with RF fingerprinting, RF pattern matching, or AECID
Using the displacement data (e.g., velocity vector), fully or partly, associated with the first positioning result for forming a fingerprint, together with other measurements, e.g., with RF fingerprinting, RF pattern matching, or AECID
Obtaining a positioning prediction using dead reckoning based on reference location information and displacement determined based on historical data or statistics collected for one or more users, e.g.,
  The historical data or collected statistics may indicate one or more probable (e.g., with a certain confidence) locations after a certain time from the last reference location Controlling of Dead Reckoning This embodiment may be a standalone solution or may be used in combination with other solutions disclosed herein. Methods of controlling dead reckoning configuration is disclosed in this section.

Currently, dead reckoning positioning is not specified in LTE. Hence in one embodiment herein a network node selects dead reckoning positioning method for a wireless device and sends a message associated with dead reckoning positioning, e.g., to the wireless device or its serving eNodeB, where the message may comprise an indication to start using dead reckoning and may also comprise configuration parameters and/or assistance data for dead reckoning, which may be provided via broadcast, multicast or unicast/dedicated signaling. Dead reckoning support for LTE may be realized over control plane, user plane or the combination thereof.

The configuration parameters and/or the assistance data may be used for
  configuring the reporting (e.g., result or measurement reporting or displacement data reporting) and/or
  controlling or configuring, adaptively to the received configuration parameters and/or assistance data, of the methods and apparatus used for obtaining the results, measurements, and/or displacement data for dead reckoning, e.g.,
    a wireless device adaptively configures or controls measurement periodicity and/or accuracy of sensors used for obtaining the displacement information;
    power consumption and/or battery level may also be taken into account while controlling the methods and apparatus used for obtaining the results, measurements, and/or displacement data for dead reckoning, e.g., longer sensor measurement periodicity and lower target accuracy may reduce power consumption and prolong battery life of the wireless device.

The node receiving the message may respond with a positioning result obtained using dead reckoning or the displacement data to be used in a network node for positioning, including dead reckoning positioning, or for general RRM and network planning tasks.

There may also be defined at least one capability associated with dead reckoning for a node, e.g., radio node (e.g., a wireless device, eNodeB or LMU) may indicate its capability/ability to support dead reckoning positioning and/or the ability to obtain a certain category of displacement data (e.g., from a certain type of sensors) to a positioning server (e.g., via LPP, LPPe, or LPPa). This capability information may be taken into account by the positioning server when selecting a positioning method and when configuring dead reckoning positioning parameters or building up the assistance data. The capability information may also comprise the displacement data type which may be used or may be provided in association with dead reckoning by the radio node to the positioning server. There may also be network node and/or positioning server's capability to support dead reckoning; this capability may be provided to another node, e.g., another positioning server, to LCS Client, to one or more eNodeBs, or to a wireless device.

Configuration of Dead Reckoning

As e.g. explained in above, a dead reckoning positioning method may provide a sequence of predictions. The number of predictions may be controlled in different ways, e.g., by any one or any combination of approaches below:
- is pre-defined or obtained by a predefined rule (e.g., the number of predictions is calculated based on the total time and prediction periodicity),
- is configurable (e.g., autonomously or by another node),
- controlled on-line based on the performance (e.g., based on the prediction quality estimate and the target LCS quality—see Solution 1, Example 3),
- controlled by another node (e.g., by positioning server), e.g., with at least one of:
  - dead reckoning may be triggered by a message from another node (e.g., in the wireless device or eNodeB upon receiving a triggering message or a request from a positioning server),
    - the triggering message may also comprise dead reckoning configuration parameters
  - dead reckoning may be stopped by a message from another node (e.g., from a positioning server)
- controlled by a pre-defined (e.g., by a requirement or pre-configured in the node) or configurable condition or a triggering event, e.g.,
  - dead reckoning may be triggered when a signal strength or quality drop below a threshold for a signal used for a radio measurement needed for another positioning method,
  - determining high total interference and noise,
  - entering a certain logical area (e.g., a cell, a tracking area, a local area, etc.) or geographical area or environment (e.g., a building or environment).

In a more general case, not limited only to the case with a sequence of predictions, some example dead reckoning configuration parameters may comprise any one or more of:
- Requested number of consecutive predictions (e.g., one or more),
- Maximum number of consecutive predictions (e.g., one or more) whilst the actual number may be controlled on-line,
- Requested total prediction time span (for all consecutive predictions),
- Maximum total prediction time span (for all consecutive predictions),
- Periodicity of consecutive predictions obtained with dead reckoning,
- Periodicity of obtaining reference locations (e.g., with a different positioning method),
- A set of displacement characteristics or displacement-related measurements to be used and/or to be provided (e.g., velocity, speed, sensor measurements, etc.),
- Measurement granularity/resolution,
- Target positioning QoS for dead reckoning positioning (e.g., uncertainty and confidence, reporting delay, measurement time),
- Target displacement data quality or the maximum allowed error for displacement data to be obtained for dead reckoning,
- Triggering/stopping condition (e.g., a signal level threshold or a maximum prediction uncertainty threshold),
- Triggering condition indication for obtaining a reference location.

In one embodiment, a set of parameters common for all or a group of wireless devices (e.g., in a cell or in an area) may be configured for dead reckoning.

In another embodiment, there may be two or more sets of the dead reckoning configuration parameters, e.g., a set common for all or a group of wireless devices and a set of wireless device specific parameters.

In yet another embodiment, a positioning server may also provide assistance data for dead reckoning. The assistance data may comprise the configuration parameters. In another example, the assistance data may comprise a route or a map which may be used to facilitate dead reckoning based positioning. The route information may be derived on the knowledge of the wireless device target destination or a typical destination or route in the area, which may also be associated with the device type and/or vehicle type.

The dead reckoning configuration parameters may be signaled between two nodes (e.g., from positioning server to wireless device or eNodeB; between two network nodes e.g. two positioning nodes or two eNodeBs). Further, as described e.g., in Solution 1, one or more displacement data may also be signaled between two nodes (e.g., from the wireless device or eNodeB to positioning server). Based on this information, the positioning server would then obtain one or more predictions using dead reckoning. In another example, the node obtaining the displacement data (e.g., a wireless device or eNodeB) obtains also one or more predictions; these predictions may then be signaled to another node (e.g., positioning server). Together with the result, the node may also provide: the result quality, indication of displacement data used for obtaining the result, time stamps associated with the one or more reported predictions. The node obtaining the prediction using dead reckoning (e.g., by calculation or by receiving from another node) may further signal the result to another node, e.g., PSAP, LCS Client requesting positioning, MME, etc.

Figure 4:
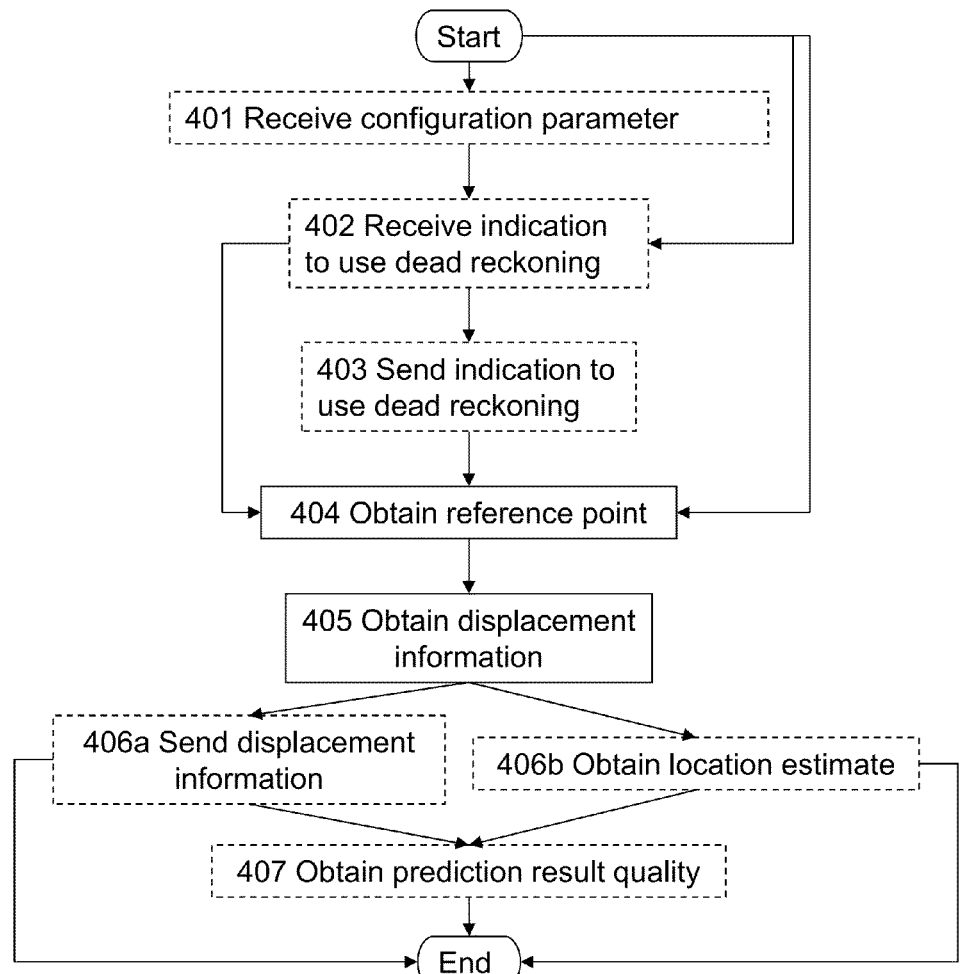
FIG. 4 is a flowchart illustrating embodiments of the method in the radio network node.

FIG. 4 illustrates embodiments of the method, performed by the radio network node 110, of obtaining a location estimate as show in FIG. 3. As mentioned, the location estimate indicates a location of a target radio node 110, 120. The method may be performed by a LCS client executed in the radio network node 110.

The following actions may be performed in any suitable order.

Action 401

The radio network node 110 may receive 302, from a positioning node 130, at least one configuration parameter for dead reckoning and/or assistance data for dead reckoning. The at least one configuration parameter may comprise one or more of:

- requested number of consecutive predictions,
- maximum number of consecutive predictions,
- total prediction time span,
- maximum total prediction time span, and the like.

This action is similar to action 302.

Action 402

The radio network node 110 may receive, from a positioning node 130 or the target radio node 110, 120, an indication to start using dead reckoning when performing the obtaining of the location estimate. This action is similar to action 305.

Action 404

The radio network node 110 obtains a reference point for the target radio node 110, 120. The obtaining 404 of the reference point may comprise one or more of:

- receiving the reference point from the target radio node 110, 120;
- determining the reference point;
- receiving the reference point from another network node; and
- obtaining the reference point according to a pre-define rule.

This action is similar to action 312.

Action 405

The radio network node 110 obtains displacement information indicating displacement, in relation to the reference point, of the target radio node 110, 120. The obtaining 405 of displacement information may comprise one or more of:

- receiving the displacement information from the target radio node 110, 120;
- determining the displacement information;
- receiving the displacement information from another network node; and
- obtaining the displacement information according to a pre-defined rule.

This action is similar to action 313.

Action 406a

The radio network node 110 sends at least the displacement information to another network node. This action is similar to action 314a.

Action 406b

Alternatively or additionally to action 406a, the radio network node 110 obtains 314b the location estimate by dead reckoning based on the displacement information and the reference point. The obtaining of the location estimate by dead reckoning may further comprise dynamically predicting the location estimate based on the displacement information and the reference point. This action is similar to action 314b.

In some embodiments, the radio network node 110 may perform hybrid positioning by combining the obtaining 406b of the location estimate by dead reckoning with a further positioning method.

Action 407

The radio network node 110 may obtain a prediction result quality for the location estimate. The prediction result quality may depend on one or more of the following parameters or characteristics:

- a number of consecutive location estimates,
- a time elapsed from the location estimate and/or the reference point,
- a displacement characteristic or maneuver characteristic,
- a quality of the reference point,
- a quality of the displacement information,
- a type of the radio node, and the like.

This action is similar to action 315.

Figure 5:
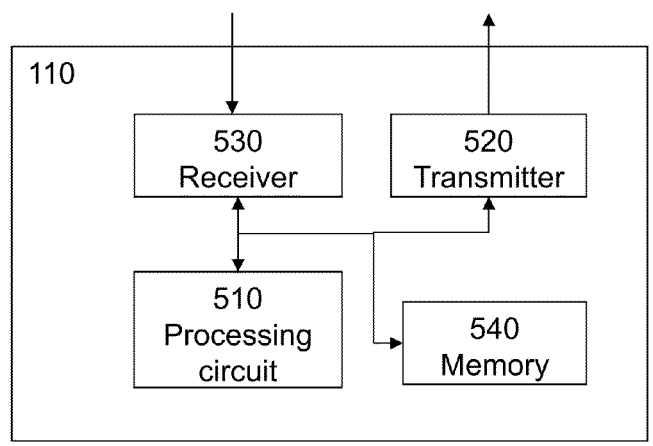
FIG. 5 is a block diagram illustrating embodiments of the radio network node.

FIG. 5 illustrates embodiments of the radio network node 110 configured to obtain a location estimate. The location estimate indicates a location of a target radio node 110, 120.

The radio network node 110 may be configured with an LCS client for example by means of a software or hardware configuration or a combination thereof.

The radio network node 110 comprises a processing circuit 510 configured to obtain a reference point for the target radio node 110, 120; and to obtain displacement information indicating displacement, in relation to the reference point, of the target radio node 110, 120. Moreover, the processing circuit 510 is further configured to send at least the displacement information to another network node, and/or to obtain the location estimate by dead reckoning based on the displacement information and the reference point.

The processing circuit 510 may further be configured to one of more of:

- receive the displacement information from the target radio node 110, 120;
- determine the displacement information;
- receive the displacement information from another network node; and
- obtain the displacement information according to a pre-defined rule.

The processing circuit 510 may further be configured to one of more of:

- receive the reference point from the target radio node 110, 120;
- determine the reference point;
- receive the reference point from another network node; and
- obtain the reference point according to a pre-define rule.

The processing circuit 510 may further be configured to receive, from a positioning node 130 or the target radio node 110, 120, an indication to start using dead reckoning when performing the obtaining of the location estimate.

The processing circuit 510 may further be configured to receive, from a positioning node 130, at least one configuration parameter for dead reckoning and/or assistance data for dead reckoning. The at least one configuration parameter may comprise one or more of:

- requested number of consecutive predictions,
- maximum number of consecutive predictions,
- total prediction time span,
- maximum total prediction time span, and the like.

The processing circuit 510 may further be configured to dynamically predict the location estimate based on the displacement information and the reference point.

The processing circuit 510 may further be configured to perform hybrid positioning by combining the obtaining 314b of the location estimate by dead reckoning with a further positioning method.

The processing circuit 510 may further be configured to obtain 315 a prediction result quality for the location estimate. The prediction result quality may depend on one or more of the following parameters or characteristics:

- a number of consecutive location estimates,
- a time elapsed from the location estimate and/or the reference point,
- a displacement characteristic or maneuver characteristic,
- a quality of the reference point,
- a quality of the displacement information,
- a type of the radio node, and the like.

Figure 6:
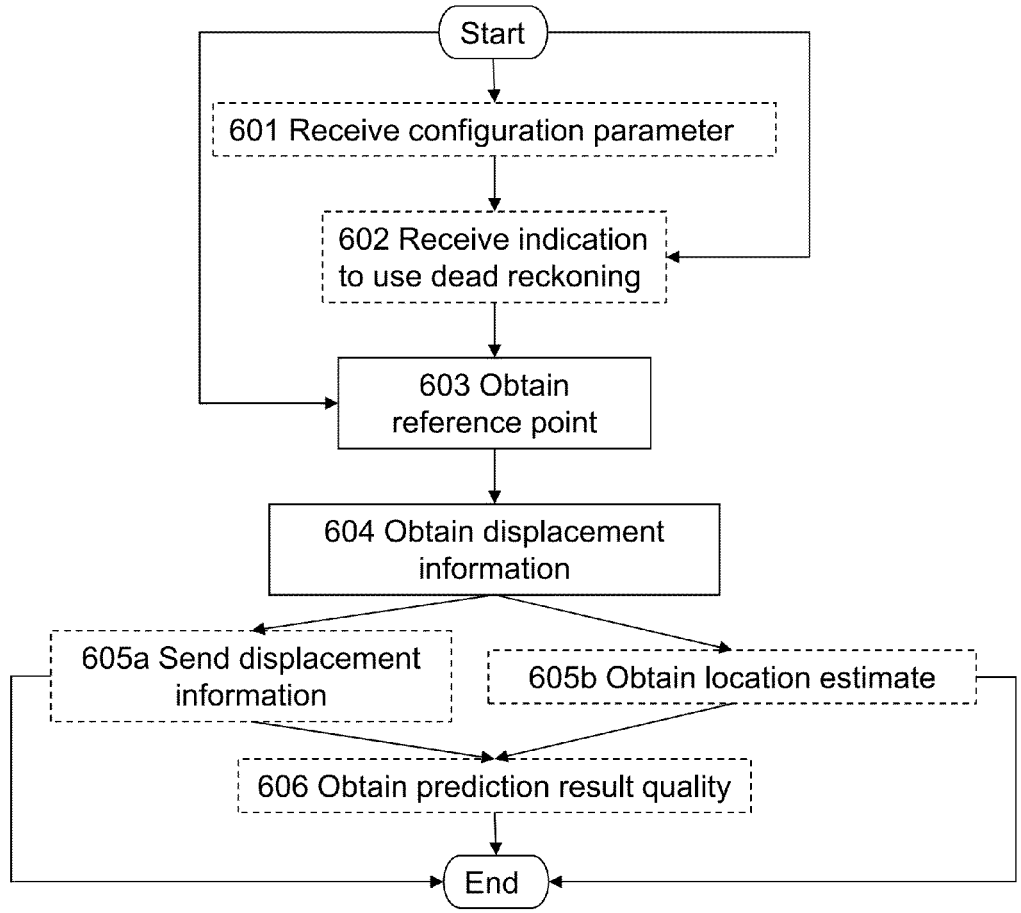
FIG. 6 is a flowchart illustrating embodiments of the method in the wireless device.

FIG. 6 illustrates embodiments of the method, performed by the wireless device 120, of obtaining a location estimate as shown in FIG. 3. As mentioned, the location estimate indicates a location of the wireless device 120. The wireless device 120 is operated to obtain the location estimate by use of functionality provided by a cellular telecommunication system 100. The method may be performed by a LCS client executed in the wireless device 120.

The following actions may be performed in any suitable order.

Action 601

The wireless device 120 may receive, from a positioning node 130, at least one configuration parameter for dead reckoning and/or assistance data for dead reckoning.
The at least one configuration parameter may comprise one or more of:
 requested number of consecutive predictions,
 maximum number of consecutive predictions,
 total prediction time span,
 maximum total prediction time span, and the like.
This action is similar to action 303.

Action 602

The wireless device 120 may receive, from a positioning node 130 or the radio network node 110, an indication to start using dead reckoning when performing the obtaining of the location estimate. This action is similar to action 307.

Action 603

The wireless device 120 obtains a reference point for the wireless device 120.
The obtaining of the reference point may comprise one or more of:
 receiving the reference point from the wireless device 120;
 determining the reference point;
 receiving the reference point from another network node; and
 obtaining the reference point according to a pre-define rule.
This action is similar to action 316.

Action 604

The wireless device 120 obtains 317 displacement information indicating displacement, in relation to the reference point, of the wireless device 120. The obtaining 317 of displacement information may comprise one or more of:
 receiving the displacement information from the wireless device 120;
 determining the displacement information;
 receiving the displacement information from another network node; and
 obtaining the displacement information according to a pre-defined rule.
This action is similar to action 317.

Action 605a

The wireless device 120 sends at least the displacement information to another network node. This action is similar to action 318a.

Action 605b

Alternatively or additionally to action 605a, the wireless device 120 obtains 318 the location estimate by dead reckoning based on the displacement information and the reference point. The dead reckoning may comprise dynamically predicting the location estimate based on the displacement information and the reference point.

In some embodiments, the wireless device 120 may perform hybrid positioning by combining the obtaining of the location estimate by dead reckoning with a further positioning method.

Action 606

The wireless device 120 may obtain a prediction result quality for the location estimate. The prediction result quality may depend on one or more of the following parameters or characteristics:
 a number of consecutive location estimates,
 a time elapsed from the location estimate and/or the reference point,
 a displacement characteristic or maneuver characteristic,
 a quality of the reference point,
 a quality of the displacement information,
 a type of the radio node, and the like.
This action is similar to action 319.

Figure 7:
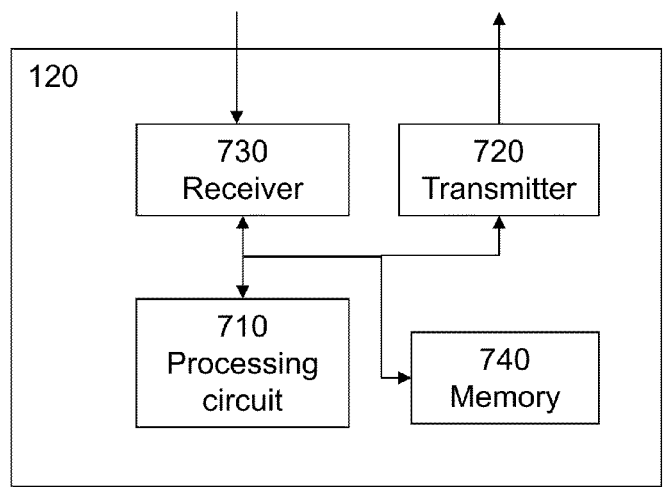
FIG. 7 is a block diagram illustrating embodiments of the wireless device.

FIG. 7 illustrates embodiments of the wireless device 120 configured to obtain a location estimate. The location estimate indicates a location of the wireless device 120. The wireless device 120 is operated to obtain the location estimate by use of functionality provided by a cellular telecommunication system 100.

The wireless device 120 may be configured with a LCS client, for example by means of a software or hardware configuration or a combination thereof.

The wireless device 120 comprises a processing circuit 710 configured to obtain a reference point for the wireless device 120; and to obtain displacement information indicating displacement, in relation to the reference point, of the wireless device 120. Moreover, the processing circuit 710 is further configured to send at least the displacement information to another network node, and/or to obtain the location estimate by dead reckoning based on the displacement information and the reference point.

The processing circuit 701 may further be configured to one or more of:
 receive the displacement information from the wireless device 120;
 determine the displacement information;
 receive the displacement information from another network node; and
 obtain the displacement information according to a pre-defined rule.

The processing circuit 701 may further be configured to one or more of:
 receive the reference point from the wireless device 120;
 determine the reference point;
 receive the reference point from another network node; and
 obtain the reference point according to a pre-define rule.

The processing circuit 701 may further be configured to receive, from a positioning node 130 or the radio network node 110, an indication to start using dead reckoning when performing the obtaining of the location estimate.

The processing circuit 701 may further be configured to receive, from a positioning node 130, at least one configuration parameter for dead reckoning and/or assistance data for dead reckoning. The at least one configuration parameter may comprise one or more of:
 requested number of consecutive predictions,
 maximum number of consecutive predictions,
 total prediction time span,
 maximum total prediction time span, and the like.

The processing circuit 701 may further be configured to dynamically predict the location estimate based on the displacement information and the reference point.

The processing circuit 701 may further be configured to perform hybrid positioning by combining the obtaining 318 of the location estimate by dead reckoning with a further positioning method.

The processing circuit 701 may further be configured to obtain a prediction result quality for the location estimate. The prediction result quality may depend on one or more of the following parameters or characteristics:

a number of consecutive location estimates,
a time elapsed from the location estimate and/or the reference point,
a displacement characteristic or maneuver characteristic,
a quality of the reference point,
a quality of the displacement information,
a type of the radio node, and the like.

Figure 8:
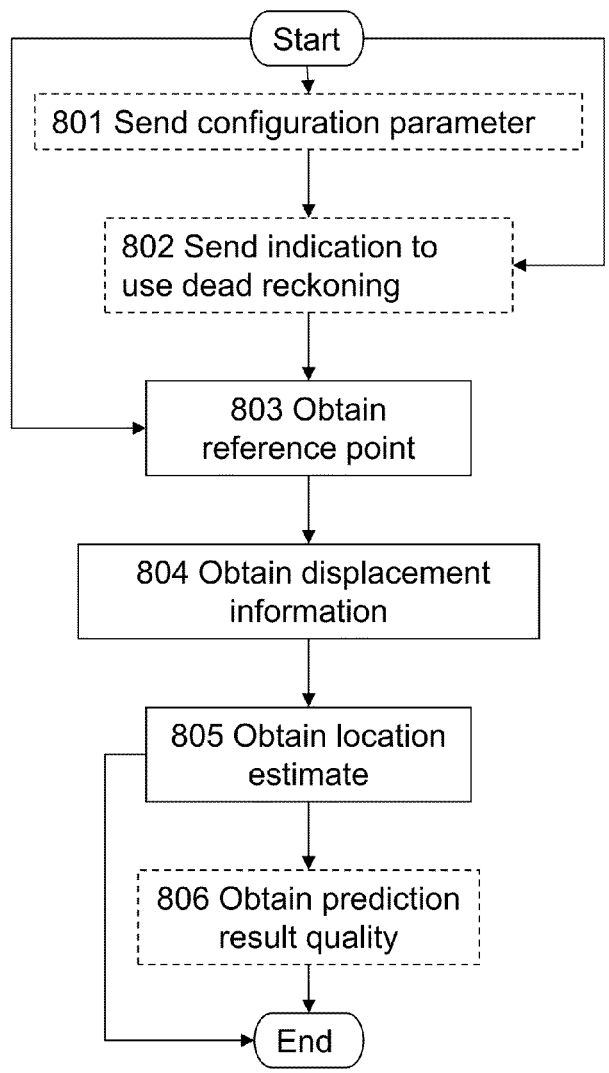
FIG. 8 is a flowchart illustrating embodiments of the method in the positioning node.

FIG. 8 illustrates embodiments of the method, performed by the positioning node 130, of obtaining a location estimate as shown in FIG. 3. As mentioned, the location estimate indicates a location of a target radio node 110, 120.

The following actions may be performed in any suitable order.

Action 801

The positioning node 130 may send to the target radio node 110, 120, at least one configuration parameter relating to the estimation of the location estimate. The at least one configuration parameter may comprise one or more of:
requested number of consecutive predictions,
maximum number of consecutive predictions,
total prediction time span,
maximum total prediction time span, and the like.
This action is similar to action 301.

Action 802

The positioning node 130 may send to an indication to start using dead reckoning to the target radio node 110, 120. This action is similar to action 304.

Action 803

The positioning node 130 obtains a reference point for the target radio node 110, 120. This action is similar to action 308.

Action 804

The positioning node 130 obtains displacement information indicating displacement, in relation to the reference point, of the target radio node 110, 120. This action is similar to action 309.

Action 805

The positioning node 130 obtains the location estimate by dead reckoning based on the displacement information and the reference point.

The obtaining of the location estimate by dead reckoning may further comprise dynamically predicting the location estimate based on the displacement information and the reference point.
This action is similar to action 310.

Action 806

The positioning node 130 may obtain a prediction result quality for the location estimate. The prediction result quality may depend on one or more of the following parameters or characteristics:
a number of consecutive location estimates,
a time elapsed from the location estimate and/or the reference point,
a displacement characteristic or maneuver characteristic,
a quality of the reference point,
a quality of the displacement information,
a type of the radio node, and the like.
This action is similar to action 311.

Figure 9:
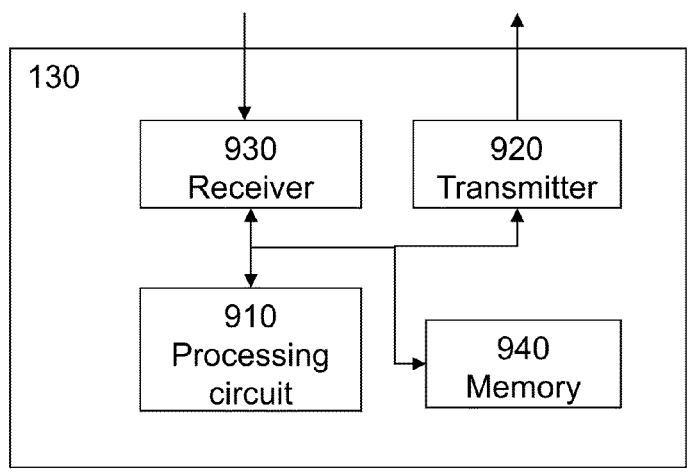
FIG. 9 is a block diagram illustrating embodiments of the positioning node.
Figure 3:
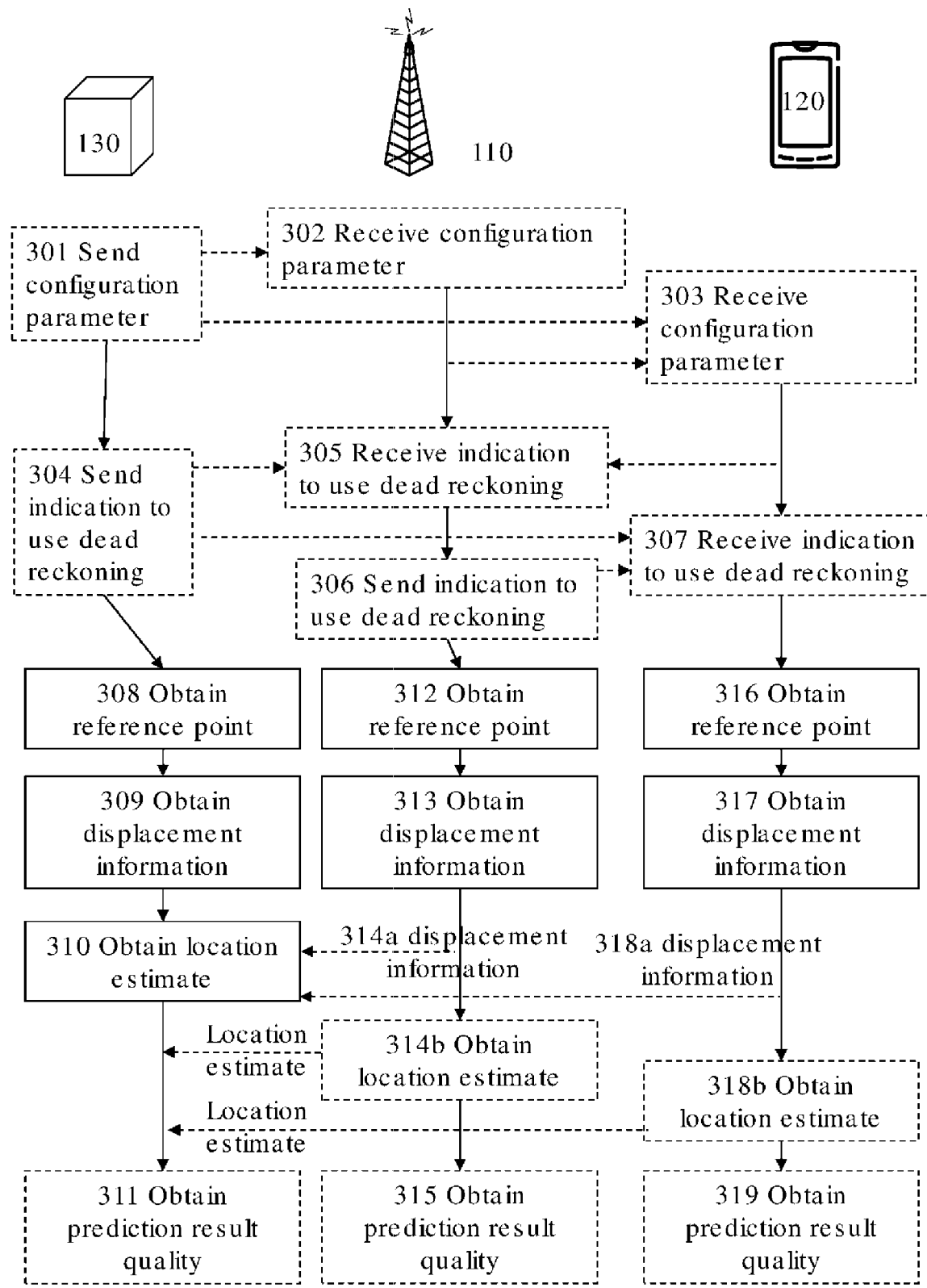

FIG. 9 illustrates embodiments of the positioning node 130 configured to obtain a location estimate. As mentioned, the location estimate indicates a location of a target radio node 110, 120.

The positioning node 130 comprises a processing circuit 910 configured to obtain a reference point for the target radio node 110, 120, to obtain displacement information indicating displacement, in relation to the reference point, of the target radio node 110, 120, and to obtain the location estimate by dead reckoning based on the displacement information and the reference point.

The processing circuit 910 may be configured to send, to the target radio node 110, 120, at least one configuration parameter relating to the estimation of the location estimate. The at least one configuration parameter may comprise one or more of:
requested number of consecutive predictions,
maximum number of consecutive predictions,
total prediction time span,
maximum total prediction time span, and the like.

The processing circuit 910 may be configured to send an indication to start using dead reckoning to the target radio node 110, 120.

The processing circuit 910 may be configured to dynamically predict the location estimate based on the displacement information and the reference point.

The processing circuit 910 may be configured to obtain a prediction result quality for the location estimate. The prediction result quality may depend on one or more of the following parameters or characteristics:
a number of consecutive location estimates,
a time elapsed from the location estimate and/or the reference point,
a displacement characteristic or maneuver characteristic,
a quality of the reference point,
a quality of the displacement information,
a type of the radio node, and the like.

As will be readily understood by those familiar with communications receiver design, the several functional blocks, as well as one or more functions may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of functions may be implemented on a processor shared with other functional components of a wireless terminal.

Alternatively, several of the functional elements of the receiver processing circuits discussed above may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are only limited by the following claims and their legal equivalents.

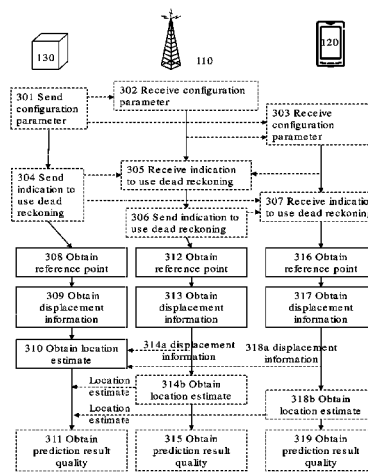

What is claimed is:

1. A method, performed by a radio network node, of obtaining a location estimate, wherein the location estimate indicates a location of a target radio node, the method comprising:

obtaining a reference point for the target radio node, wherein information associated with the obtained reference point comprises:
  a location reference (loc_ref) of the target radio node;
  a time (t_ref) when obtained the location reference (loc_ref) of the target node; and
obtaining displacement information indicating displacement, in relation to the reference point, of the target radio node, wherein displacement information comprises:
  a velocity (vel_est) of the target radio node; and,
  a time (time_meas) when obtained the velocity (vel_meas) of the target radio node, wherein the time (time_meas) is carried by one of the following:
    a systemFrameNumber field in an Observed Time Difference of Arrival (OTDOA) signal;
    a measurementReferenceTime field in an Assisted Global Positioning System (AGPS) signal; or,
    a systemFrameNumber field in an Evolved-Cell Identification (ECID) signal; and
wherein the method further comprises at least one of the following:
sending at least the displacement information to another network node; and
obtaining the location estimate by dead reckoning based on the displacement information and the reference point by calculating the following:

a time displacement (td) =$t\_meas - t\_ref$; and, the location estimate (loc_meas) =loc_ref +vel_est * td.

2. The method according to claim 1, wherein the obtaining of displacement information comprises one or more of:
  receiving the displacement information from the target radio node;
  determining the displacement information;
  receiving the displacement information from another network node; and
  obtaining the displacement information according to a pre-defined rule.

3. The method according to claim 1, wherein the obtaining of the reference point comprises one or more of:
  receiving the reference point from the target radio node;
  determining the reference point;
  receiving the reference point from another network node; and
  obtaining the reference point according to a pre-define rule.

4. The method according to claim 1, comprising:
  receiving, from a positioning node or the target radio node, an indication to start using dead reckoning when performing the obtaining of the location estimate.

5. The method according to claim 1, comprising:
  receiving, from a positioning node, at least one configuration parameter for dead reckoning and/or assistance data for dead reckoning.

6. The method according to claim 5, wherein the at least one configuration parameter comprises one or more of:
  requested number of consecutive predictions,
  maximum number of consecutive predictions,
  total prediction time span, and
  maximum total prediction time span.

7. The method according to claim 1, wherein the method is performed by a Location Service (LCS) client executed in the radio network node.

8. The method according to claim 1, wherein the obtaining of the location estimate by dead reckoning further comprises dynamically predicting the location estimate based on the displacement information and the reference point.

9. The method according to claim 1, comprising performing hybrid positioning by combining the obtaining of the location estimate by dead reckoning with a further positioning method.

10. The method according to claim 1, comprising:
  obtaining a prediction result quality for the location estimate.

11. The method according to claim 10, wherein the prediction result quality depends on one or more of the following parameters or characteristics:
  a number of consecutive location estimates,
  a time elapsed from the location estimate and/or the reference point,
  a displacement characteristic or maneuver characteristic,
  a quality of the reference point,
  a quality of the displacement information, and
  a type of the radio node.

12. A method, performed by a wireless device, of obtaining a location estimate, wherein the location estimate indicates a location of the wireless device, wherein the wireless device is operated to obtain the location estimate by use of functionality provided by a cellular telecommunication system, the method comprising:
  obtaining a reference point for the wireless device, wherein information associated with the obtained reference point comprises:
    a location reference (loc_ref) of the target radio node;
    a time (t_ref) when obtained the location reference (loc_ref) of the target node; and
  obtaining displacement information indicating displacement, in relation to the reference point, of the wireless device, wherein displacement information comprises:
    a velocity (vel_est) of the target radio node; and,
    a time (time_meas) when obtained the velocity (vel_meas) of the target radio node, wherein the time (time_meas) is carried by one of the following:
      a systemFrameNumber field in an Observed Time Difference of Arrival (OTDOA) signal;
      a measurementReferenceTime field in an Assisted Global Positioning System (AGPS) signal; or,
      a systemFrameNumber field in an Evolved-Cell Identification (ECID) signal; and
  wherein the method further comprises at least one of the following:
  sending at least the displacement information to another node; and
  obtaining the location estimate by dead reckoning based on the displacement information and the reference point by calculating the following:

a time displacement (td) =$t\_meas - t\_ref$; and, the location estimate (loc_meas) =loc_ref +vel_est * td.

13. The method according to claim 12, wherein the obtaining of displacement information comprises one or more of:
  receiving the displacement information from the wireless device;
  determining the displacement information;
  receiving the displacement information from another network node; and
  obtaining the displacement information according to a pre-defined rule.

14. The method according to claim 12, wherein the obtaining of the reference point comprises one or more of:
- receiving the reference point from the wireless device;
- determining the reference point;
- receiving the reference point from another network node; and
- obtaining the reference point according to a pre-define rule.

15. The method according to claim 12, comprising:
receiving, from a positioning node or the radio network node, an indication to start using dead reckoning when performing the obtaining of the location estimate.

16. The method according to claim 12, comprising:
receiving, from a positioning node, at least one configuration parameter for dead reckoning and/or assistance data for dead reckoning.

17. The method according to claim 16, wherein the at least one configuration parameter comprises one or more of:
- requested number of consecutive predictions,
- maximum number of consecutive predictions,
- total prediction time span, and
- maximum total prediction time span.

18. The method according to claim 12, wherein the method is performed by a Location Service (LCS) client executed in the wireless device.

19. The method according to claim 12, wherein the dead reckoning comprises dynamically predicting the location estimate based on the displacement information and the reference point.

20. The method according to claim 12, comprising performing hybrid positioning by combining the obtaining of the location estimate by dead reckoning with a further positioning method.

21. The method according to claim 12, comprising:
obtaining a prediction result quality for the location estimate.

22. The method according to claim 21, wherein the prediction result quality depends on one or more of the following parameters or characteristics:
- a number of consecutive location estimates,
- a time elapsed from the location estimate and/or the reference point,
- a displacement characteristic or maneuver characteristic,
- a quality of the reference point,
- a quality of the displacement information, and
- a type of the radio node.

23. A method, performed by a positioning node, of obtaining a location estimate, wherein the location estimate indicates a location of a target radio node, the method comprising:
obtaining a reference point for the target radio node, wherein information associated with the obtained reference point comprises:
- a location reference (loc_ref) of the target radio node;
- a time (t_ref) when obtained the location reference (loc_ref) of the target node;

obtaining displacement information indicating displacement, in relation to the reference point, of the target radio node, wherein displacement information comprises:
- a velocity (vel_est) of the target radio node; and,
- a time (time_meas) when obtained the velocity (vel_meas) of the target radio node, wherein the time (time_meas) is carried by one of the following:
  - a systemFrameNumber field in an Observed Time Difference of Arrival (OTDOA) signal;
  - a measurementReferenceTime field in an Assisted Global Positioning System (AGPS) signal; or,
  - a systemFrameNumber field in an Evolved-Cell Identification (ECID) signal; and obtaining the location estimate by dead reckoning based on the displacement information and the reference point by calculating the following:

a time displacement (td) = $t\_meas - t\_ref$; and, the location estimate (loc_meas) = $loc\_ref + vel\_est * td$.

24. The method according to claim 23, comprising:
sending, to the target radio node, at least one configuration parameter relating to the estimation of the location estimate.

25. The method according to claim 24, wherein the at least one configuration parameter comprises one or more of:
- requested number of consecutive predictions,
- maximum number of consecutive predictions,
- total prediction time span, and
- maximum total prediction time span.

26. The method according to claim 23, comprising:
sending an indication to start using dead reckoning to the target radio node.

27. The method according to claim 23, wherein the obtaining of the location estimate by dead reckoning further comprises dynamically predicting the location estimate based on the displacement information and the reference point.

28. The method according to claim 23, comprising:
obtaining a prediction result quality for the location estimate.

29. The method according to claim 28, wherein the prediction result quality depends on one or more of the following parameters or characteristics:
- a number of consecutive location estimates,
- a time elapsed from the location estimate and/or the reference point,
- a displacement characteristic or maneuver characteristic,
- a quality of the reference point,
- a quality of the displacement information, and
- a type of the radio node.

30. A radio network node configured to obtain a location estimate, wherein the location estimate indicates a location of a target radio node, the radio network node comprising a processing circuit configured to:
obtain a reference point for the target radio node, wherein information associated with the obtained reference point comprises:
- a location reference (loc_ref) of the target radio node;
- a time (t_ref) when obtained the location reference (loc_ref) of the target node; and obtain displacement information indicating displacement, in relation to the reference point, of the target radio node, wherein displacement information comprises:
- a velocity (vel_est) of the target radio node; and,
- a time (time_meas) when obtained the velocity (vel_meas) of the target radio node, wherein the time (time_meas) is carried by one of the following:
  - a systemFrameNumber field in an Observed Time Difference of Arrival (OTDOA) signal;
  - a measurementReferenceTime field in an Assisted Global Positioning System (AGPS) signal; or,
  - a systemFrameNumber field in an Evolved-Cell Identification (ECID) signal; and wherein the processing circuit further is configured to enable at least one of the following:
send at least the displacement information to another network node, and/or obtain the location estimate by dead reckoning based on the displacement information and the reference point by calculating the following:

a time displacement (td) =$t\_meas$ −$t\_ref$; and, the location estimate (loc_meas) =loc_ref +vel_est * td.

31. A wireless device configured to obtain a location estimate, wherein the location estimate indicates a location of the wireless device, wherein the wireless device is operated to obtain the location estimate by use of functionality provided by a cellular telecommunication system, the wireless device comprising a processing circuit configured to:
   obtain a reference point for the wireless device, wherein information associated with the obtained reference point comprises:
       a location reference (loc_ref) of the target radio node;
       a time (t_ref) when obtained the location reference (loc_ref) of the target node; and
   obtain displacement information indicating displacement, in relation to the reference point, of the wireless device, wherein displacement information comprises:
       a velocity (vel_est) of the target radio node; and,
       a time (time_meas) when obtained the velocity (vel_meas) of the target radio node, wherein the time (time_meas) is carried by one of the following:
           a systemFrameNumber field in an Observed Time Difference of Arrival (OTDOA) signal;
           a measurementReferenceTime field in an Assisted Global Positioning System (AGPS) signal; or,
           a systemFrameNumber field in an Evolved-Cell Identification (ECID) signal; and
   wherein the processing circuit further is configured to enable at least one of the following:
   send at least the displacement information to another network node, and/or and
   obtain the location estimate by dead reckoning based on the displacement information and the reference point by calculating the following:

a time displacement (td) =$t\_meas$ −$t\_ref$; and, the location estimate (loc_meas) =loc_ref +vel_est * td.

32. A positioning node configured to obtain a location estimate, wherein the location estimate indicates a location of a target radio node, the positioning node comprising a processing circuit configured to:
   obtain a reference point for the target radio node, wherein information associated with the obtained reference point comprises:
       a location reference (loc_ref) of the target radio node;
       a time (t_ref) when obtained the location reference (loc_ref) of the target node;
   obtain displacement information indicating displacement, in relation to the reference point, of the target radio node, wherein displacement information comprises:
       a velocity (vel_est) of the target radio node; and,
       a time (time_meas) when obtained the velocity (vel_meas) of the target radio node, wherein the time (time_meas) is carried by one of the following:
           a systemFrameNumber field in an Observed Time Difference of Arrival (OTDOA) signal;
           a measurementReferenceTime field in an Assisted Global Positioning System (AGPS) signal; or,
           a systemFrameNumber field in an Evolved-Cell Identification (ECID) signal; and
   obtain the location estimate by dead reckoning based on the displacement information and the reference point by calculating the following:

a time displacement (td) =$t\_meas$ −$t\_ref$; and, the location estimate (loc_meas) =loc_ref +vel_est * td.

33. The method according to claim 1, wherein the location estimate (loc_meas) is obtained using the time (t_meas) carried by the systemFrameNumber field in the OTDOA signal, the method further comprises:
   using the obtained location estimate (loc_meas) to estimate a timing error and location error of the radio network node, and
   compensating for the estimated timing error and the estimated location error to enhance an accuracy of the obtained location estimate (loc_meas).

34. The method according to claim 1, wherein the location estimate (loc_meas) is obtained using the time (t_meas) carried by the systemFrameNumber field in the ECID signal, the method further comprises:
   pairing the obtained location estimate (loc_meas) with radio measurements to improve a quality of the information associated with the reference point.

* * * * *

UNITED STATES PATENT AND TRADEMARK OFFICE
CERTIFICATE OF CORRECTION

| | |
|---|---|
| PATENT NO. | : 9,188,659 B2 |
| APPLICATION NO. | : 13/933001 |
| DATED | : November 17, 2015 |
| INVENTOR(S) | : Siomina et al. |

It is certified that error appears in the above-identified patent and that said Letters Patent is hereby corrected as shown below:

Delete the title page and substitute therefore with the attached title page consisting of the corrected illustrative figure.

In the Drawings

Please replace Fig. 3 with Fig. 3 as shown on the attached page.

In the Claims

In Column 39, Line 6, in Claim 30, delete "=loc ref +vel_est * td." and insert -- =loc_ref +vel_est * td. --, therefor.

In Column 39, Line 36, in Claim 31, delete "node, and/or and" and insert -- node, and --, therefor.

In Column 39, Line 40, in Claim 31, delete "=$t_{\_l\,meas}\_t$_ref; and," and insert -- = t_meas – t_ref; and, --, therefor.

Signed and Sealed this
Fourteenth Day of June, 2016

Michelle K. Lee
*Director of the United States Patent and Trademark Office*

(12) United States Patent
Siomina et al.

(10) Patent No.: US 9,188,659 B2
(45) Date of Patent: Nov. 17, 2015

(54) METHODS AND NETWORK NODES FOR POSITIONING BASED ON DISPLACEMENT DATA

(71) Applicant: TELEFONAKTIEBOLAGET L M ERICSSON (PUBL), Stockholm (SE)

(72) Inventors: Iana Siomina, Solna (SE); Yang Zhang, Shanghai (CN)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 137 days.

(21) Appl. No.: 13/933,001

(22) Filed: Jul. 1, 2013

(65) Prior Publication Data
US 2014/0099970 A1    Apr. 10, 2014

Related U.S. Application Data

(60) Provisional application No. 61/712,195, filed on Oct. 10, 2012.

(51) Int. Cl.
| | |
|---|---|
| *H04W 24/00* | (2009.01) |
| *G01S 5/00* | (2006.01) |
| *G01S 19/49* | (2010.01) |
| *G01S 5/02* | (2010.01) |
| *H04W 64/00* | (2009.01) |
| *G01C 21/16* | (2006.01) |

(52) U.S. Cl.
CPC ............ *G01S 5/009* (2013.01); *G01C 21/165* (2013.01); *G01S 5/0036* (2013.01); *G01S 5/0081* (2013.01); *G01S 5/0263* (2013.01); *G01S 5/0294* (2013.01); *G01S 19/49* (2013.01); *H04W 64/00* (2013.01)

(58) Field of Classification Search
CPC .................................. H04W 64/00; H04W 4/02
USPC ............. 455/456.1, 456.2, 456.6; 340/573.1
See application file for complete search history.

(56) References Cited

U.S. PATENT DOCUMENTS

| | | | |
|---|---|---|---|
| 2004/0132461 A1 | 7/2004 | Duncan | |
| 2006/0125644 A1* | 6/2006 | Sharp | 340/573.1 |
| 2009/0054076 A1 | 2/2009 | Evennou et al. | |
| 2010/0331012 A1 | 12/2010 | Zhang | |
| 2011/0250906 A1 | 10/2011 | Siomina et al. | |

FOREIGN PATENT DOCUMENTS

| | | |
|---|---|---|
| EP | 2 026 088 A2 | 2/2009 |
| EP | 2 500 692 A1 | 9/2012 |
| WO | WO 2009/021068 A1 | 2/2009 |
| WO | WO 2009/068530 A1 | 6/2009 |
| WO | WO 2011/126448 A2 | 10/2011 |

* cited by examiner

*Primary Examiner* — Chuck Huynh

(57) ABSTRACT

Methods, a radio network node (110), a wireless device (120) and a positioning node (130) for obtaining a location estimate are disclosed. The location estimate indicates a location of a target radio node (110, 120). The wireless device (120) is operated to obtain the location estimate by use of functionality provided by a cellular telecommunication system (100). A node (110, 120, 130) refers to any one of the radio network node (110), the wireless device (120) and the positioning node (130). The node (110, 120, 130) obtains (308, 312, 316) a reference point for the target radio node (110, 120). The node (110, 120, 130) obtains (309, 313, 317) displacement information indicating displacement, in relation to the reference point, of the target radio node (110, 120). The node (110, 120, 130) sends (314a, 318a)) the displacement information and/or obtains (310, 314b, 318b) the location estimate by dead reckoning based on the displacement information and the reference point.

34 Claims, 6 Drawing Sheets